US012587657B2

(12) United States Patent
Amini et al.

(10) Patent No.: US 12,587,657 B2
(45) Date of Patent: Mar. 24, 2026

(54) TRANSCODING IN SECURITY CAMERA APPLICATIONS

(71) Applicant: Arlo Technologies, Inc., Carlsbad, CA (US)

(72) Inventors: Peiman Amini, Mountain View, CA (US); Joseph Amalan Arul Emmanuel, Cupertino, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 298 days.

(21) Appl. No.: 18/305,722

(22) Filed: Apr. 24, 2023

(65) Prior Publication Data

US 2023/0262234 A1 Aug. 17, 2023

Related U.S. Application Data

(63) Continuation-in-part of application No. 17/345,204, filed on Jun. 11, 2021, now Pat. No. 11,671,606, (Continued)

(51) Int. Cl.
*H04L 43/12* (2022.01)
*G06F 9/54* (2006.01)
(Continued)

(52) U.S. Cl.
CPC ........... *H04N 19/166* (2014.11); *G06F 9/542* (2013.01); *G06T 7/20* (2013.01); *G06V 20/52* (2022.01);
(Continued)

(58) Field of Classification Search
CPC .. H04N 19/166; H04N 19/103; H04N 19/124; H04N 19/156; H04N 19/184;
(Continued)

(56) References Cited

U.S. PATENT DOCUMENTS 7,460,476 B1 * 12/2008 Morris ................ H04W 72/569
370/230.1
7,539,489 B1 5/2009 Alexander
(Continued)

FOREIGN PATENT DOCUMENTS

CN 103493397 A 1/2014
CN 104066146 A 9/2014
(Continued)

OTHER PUBLICATIONS

"Amazon Kinesis Video Streams Developer Guide", Amazon Web Services, Inc., 2018, 136 pp.
(Continued)

*Primary Examiner* — Tauqir Hussain
(74) *Attorney, Agent, or Firm* — Perkins Coie LLP

(57) ABSTRACT

The disclosure is related to adaptive transcoding of video streams from a camera. A camera system includes a camera and a base station connected to each other in a first communication network, which can be a wireless network. When a user requests to view a video from the camera, the base station obtains a video stream from the camera, transcodes the video stream, based on one or more input parameters, to generate a transcoded video stream, and transmits the transcoded video stream to a user device. The base station can transcode the video stream locally, e.g., within the base station, or in a cloud network based on transcoding location factors. Further, the camera system can also determine whether to stream the video to the user directly from the base station or from the cloud network based on streaming location factors.

14 Claims, 16 Drawing Sheets

Related U.S. Application Data which is a continuation of application No. 15/994,270, filed on May 31, 2018, now Pat. No. 11,064,208.

(60) Provisional application No. 62/633,017, filed on Feb. 20, 2018.

(51) Int. Cl.

| | |
|---|---|
| *G06T 7/20* | (2017.01) |
| *G06V 20/52* | (2022.01) |
| *G07C 9/37* | (2020.01) |
| *G08B 3/10* | (2006.01) |
| *G08B 5/22* | (2006.01) |
| *G08B 13/191* | (2006.01) |
| *G08B 13/193* | (2006.01) |
| *G08B 13/196* | (2006.01) |
| *G08B 21/18* | (2006.01) |
| *G08B 27/00* | (2006.01) |
| *G08B 29/18* | (2006.01) |
| *H04B 17/318* | (2015.01) |
| *H04B 17/391* | (2015.01) |
| *H04L 1/00* | (2006.01) |
| *H04L 5/00* | (2006.01) |
| *H04L 43/0852* | (2022.01) |
| *H04L 43/16* | (2022.01) |
| *H04L 65/612* | (2022.01) |
| *H04L 65/65* | (2022.01) |
| *H04L 65/80* | (2022.01) |
| *H04L 67/1087* | (2022.01) |
| *H04N 7/12* | (2006.01) |
| *H04N 7/18* | (2006.01) |
| *H04N 17/00* | (2006.01) |
| *H04N 19/103* | (2014.01) |
| *H04N 19/124* | (2014.01) |
| *H04N 19/156* | (2014.01) |
| *H04N 19/166* | (2014.01) |
| *H04N 19/184* | (2014.01) |
| *H04N 19/40* | (2014.01) |
| *H04N 19/42* | (2014.01) |
| *H04N 23/60* | (2023.01) |
| *H04N 23/661* | (2023.01) |
| *H04N 23/68* | (2023.01) |
| *H04N 23/90* | (2023.01) |
| *H04W 24/08* | (2009.01) |
| *H04W 24/10* | (2009.01) |
| *H04W 28/02* | (2009.01) |
| *H04W 36/00* | (2009.01) |
| *H04W 36/30* | (2009.01) |
| *H04W 52/02* | (2009.01) |
| *H04W 72/0453* | (2023.01) |
| *H04W 72/23* | (2023.01) |
| *H05B 47/105* | (2020.01) |
| *H04N 7/14* | (2006.01) |
| *H04N 19/00* | (2014.01) |
| *H05B 47/19* | (2020.01) |

(52) U.S. Cl.
CPC ................ *G07C 9/37* (2020.01); *G08B 3/10* (2013.01); *G08B 3/1016* (2013.01); *G08B 5/223* (2013.01); *G08B 13/191* (2013.01); *G08B 13/193* (2013.01); *G08B 13/19656* (2013.01); *G08B 13/1966* (2013.01); *G08B 13/19669* (2013.01); *G08B 13/19695* (2013.01); *G08B 21/182* (2013.01); *G08B 27/006* (2013.01); *G08B 29/183* (2013.01); *H04B 17/318* (2015.01); *H04B 17/391* (2015.01); *H04L 1/0003* (2013.01); *H04L 1/0009* (2013.01); *H04L 1/0017* (2013.01); *H04L 1/0033* (2013.01); *H04L 5/0053* (2013.01); *H04L 43/0858* (2013.01); *H04L 43/12* (2013.01); *H04L 43/16* (2013.01); *H04L 65/612* (2022.05); *H04L 65/65* (2022.05); *H04L 65/80* (2013.01); *H04L 67/1093* (2013.01); *H04N 7/12* (2013.01); *H04N 7/183* (2013.01); *H04N 17/002* (2013.01); *H04N 19/103* (2014.11); *H04N 19/124* (2014.11); *H04N 19/156* (2014.11); *H04N 19/184* (2014.11); *H04N 19/40* (2014.11); *H04N 19/42* (2014.11); *H04N 23/661* (2023.01); *H04N 23/665* (2023.01); *H04N 23/6811* (2023.01); *H04N 23/90* (2023.01); *H04W 24/08* (2013.01); *H04W 24/10* (2013.01); *H04W 28/021* (2013.01); *H04W 36/0011* (2013.01); *H04W 36/30* (2013.01); *H04W 52/0245* (2013.01); *H04W 52/0261* (2013.01); *H04W 72/0453* (2013.01); *H04W 72/23* (2023.01); *H05B 47/105* (2020.01); *G06T 2207/30232* (2013.01); *G06T 2207/30241* (2013.01); *H04N 7/147* (2013.01); *H04N 7/181* (2013.01); *H04N 19/00* (2013.01); *H05B 47/19* (2020.01)

(58) Field of Classification Search
CPC ...... H04N 19/40; H04N 19/42; H04B 17/318; H04B 17/391; H05B 47/19; H05B 47/105; H04L 65/80; H04L 67/1093
USPC ........................................................ 709/219
See application file for complete search history.

(56) References Cited

U.S. PATENT DOCUMENTS

| | | | | |
|---|---|---|---|---|
| 7,633,869 B1* | 12/2009 | Morris | .................. | H04L 69/166 |
| | | | | 370/468 |
| 8,855,035 B2 | 10/2014 | Lemoine et al. | | |
| 9,179,495 B1 | 11/2015 | Scherzer et al. | | |
| 9,451,484 B2 | 9/2016 | Boulton | | |
| 9,712,814 B2 | 7/2017 | Tanaka et al. | | |
| 9,996,750 B2* | 6/2018 | Campbell | .............. | G06V 20/47 |
| 10,033,436 B2 | 7/2018 | Thubert et al. | | |
| 10,044,104 B1 | 8/2018 | Bartko et al. | | |
| 10,177,965 B1* | 1/2019 | Joshi | ..................... | H04L 67/141 |
| 10,425,638 B2 | 9/2019 | Yu et al. | | |
| 11,228,792 B1* | 1/2022 | Ram | ....................... | H04L 65/80 |
| 11,232,415 B2* | 1/2022 | Melika | .................. | H04L 9/3236 |
| 11,558,626 B2 | 1/2023 | Amini et al. | | |
| 2001/0027441 A1* | 10/2001 | Wankmueller | ....... | G06Q 20/367 |
| | | | | 705/41 |
| 2002/0059627 A1 | 5/2002 | Islam et al. | | |
| 2002/0105921 A1 | 8/2002 | Sawyer et al. | | |
| 2002/0181637 A1 | 12/2002 | Nakabayashi | | |
| 2003/0055908 A1 | 3/2003 | Brown et al. | | |
| 2003/0063277 A1 | 4/2003 | Kennedy et al. | | |
| 2003/0193525 A1 | 10/2003 | Nygaard | | |
| 2005/0083947 A1 | 4/2005 | Vaarala et al. | | |
| 2005/0086569 A1 | 4/2005 | Hiddink et al. | | |
| 2005/0168403 A1* | 8/2005 | Ebersole | .............. | G02B 27/017 |
| | | | | 345/8 |
| 2005/0169209 A1 | 8/2005 | Miu et al. | | |
| 2007/0153916 A1* | 7/2007 | Demircin | ........... | H04N 21/2365 |
| | | | | 375/240.26 |
| 2008/0020746 A1 | 1/2008 | Alexandar et al. | | |
| 2008/0025378 A1 | 1/2008 | Mahany et al. | | |
| 2008/0026748 A1 | 1/2008 | Alexander et al. | | |
| 2008/0069104 A1 | 3/2008 | Von et al. | | |
| 2008/0112315 A1* | 5/2008 | Hu | ...................... | H04L 67/1085 |
| | | | | 348/E7.071 |
| 2008/0320108 A1 | 12/2008 | Murty et al. | | |

(56) References Cited

U.S. PATENT DOCUMENTS

| | | | | |
|---|---|---|---|---|
| 2009/0022222 A1* | 1/2009 | He | | H04N 19/597 |
| | | | | 375/240.12 |
| 2009/0273679 A1 | 11/2009 | Gere et al. | | |
| 2009/0290019 A1 | 11/2009 | Mcnelis et al. | | |
| 2010/0080205 A1 | 4/2010 | Hirsch et al. | | |
| 2010/0097472 A1 | 4/2010 | Chathukutty et al. | | |
| 2010/0109934 A1 | 5/2010 | Drake et al. | | |
| 2010/0208724 A1 | 8/2010 | Booth et al. | | |
| 2010/0285753 A1 | 11/2010 | Foegelle | | |
| 2011/0149865 A1 | 6/2011 | Nakao | | |
| 2011/0159865 A1 | 6/2011 | Nakao | | |
| 2011/0320555 A1 | 12/2011 | Qiu | | |
| 2012/0210853 A1* | 8/2012 | Abershitz | | F42B 15/08 |
| | | | | 89/1.11 |
| 2012/0314875 A1* | 12/2012 | Lee | | G10L 19/008 |
| | | | | 381/23 |
| 2013/0021912 A1 | 1/2013 | Finlow-bates et al. | | |
| 2013/0053653 A1 | 2/2013 | Cuddihy et al. | | |
| 2013/0089039 A1 | 4/2013 | Vashi et al. | | |
| 2013/0128947 A1 | 5/2013 | Fryer et al. | | |
| 2014/0036993 A1 | 2/2014 | Bae | | |
| 2014/0051379 A1 | 2/2014 | Ganesh et al. | | |
| 2014/0064120 A1 | 3/2014 | Sethuraman et al. | | |
| 2014/0092755 A1 | 4/2014 | Van De Ven et al. | | |
| 2014/0115114 A1* | 4/2014 | Garmark | | H04L 69/329 |
| | | | | 709/219 |
| 2014/0169195 A1 | 6/2014 | Hsin et al. | | |
| 2014/0169509 A1 | 6/2014 | Tsofe | | |
| 2014/0229880 A1 | 8/2014 | Aradhye | | |
| 2014/0240491 A1 | 8/2014 | Kauniskangas et al. | | |
| 2014/0269655 A1 | 9/2014 | Du et al. | | |
| 2014/0307707 A1 | 10/2014 | Mestanov et al. | | |
| 2014/0358592 A1 | 12/2014 | Wedig et al. | | |
| 2014/0368601 A1* | 12/2014 | deCharms | | H04N 7/148 |
| | | | | 348/14.02 |
| 2015/0185857 A1 | 7/2015 | Jung | | |
| 2015/0229426 A1 | 8/2015 | Yu et al. | | |
| 2015/0312572 A1 | 10/2015 | Owen | | |
| 2015/0319411 A1 | 11/2015 | Kasmir et al. | | |
| 2015/0349859 A1 | 12/2015 | Emmanuel et al. | | |
| 2015/0381310 A1 | 12/2015 | Hammarwall et al. | | |
| 2016/0105644 A1* | 4/2016 | Smith | | G08B 13/19667 |
| | | | | 348/159 |
| 2016/0112935 A1 | 4/2016 | Ahuja et al. | | |
| 2016/0114887 A1* | 4/2016 | Zhou | | H04N 23/51 |
| | | | | 348/148 |
| 2016/0125714 A1 | 5/2016 | Kates et al. | | |
| 2016/0165620 A1 | 6/2016 | Dagen et al. | | |
| 2016/0225158 A1* | 8/2016 | Tsubota | | G06T 7/85 |
| 2016/0243441 A1* | 8/2016 | Garbowski | | A63F 13/65 |
| 2016/0262120 A1 | 9/2016 | Shani et al. | | |
| 2016/0278104 A1 | 9/2016 | Hiremath et al. | | |
| 2016/0337243 A1 | 11/2016 | Cui et al. | | |
| 2016/0366702 A1 | 12/2016 | Baba et al. | | |
| 2017/0055179 A1 | 2/2017 | Radunovic et al. | | |
| 2017/0070732 A1 | 3/2017 | Roulet et al. | | |
| 2017/0078242 A1 | 3/2017 | Nakamura et al. | | |
| 2017/0180442 A1* | 6/2017 | Lawrence | | H04L 65/80 |
| 2017/0192700 A1* | 7/2017 | Wozniak | | G06F 3/0653 |
| 2017/0237673 A1 | 8/2017 | Law | | |
| 2017/0242129 A1 | 8/2017 | Kallankari et al. | | |
| 2017/0244712 A1 | 8/2017 | Meredith et al. | | |
| 2017/0289624 A1* | 10/2017 | Avila | | G06V 20/49 |
| 2017/0301201 A1* | 10/2017 | Siann | | H04N 23/51 |
| 2017/0301203 A1* | 10/2017 | Matsuura | | G08B 13/19656 |
| 2017/0347112 A1* | 11/2017 | Zhang | | H04L 65/70 |
| 2018/0060496 A1* | 3/2018 | Bulleit | | H04L 9/0643 |
| 2018/0069697 A1* | 3/2018 | Di Nicola | | G09C 5/00 |
| 2018/0206176 A1* | 7/2018 | Panteleev | | H04W 28/04 |
| 2018/0254099 A1* | 9/2018 | Beydoun | | G06T 7/0012 |
| 2018/0306904 A1 | 10/2018 | Vacanti | | |
| 2018/0329211 A1* | 11/2018 | Yang | | A63F 13/25 |
| 2018/0375594 A1 | 12/2018 | Kildal et al. | | |
| 2019/0014005 A1* | 1/2019 | Lessmann | | H04L 41/5054 |
| 2019/0014388 A1* | 1/2019 | Rutledge | | H04N 21/6379 |
| 2019/0089701 A1* | 3/2019 | Mercury | | G06Q 10/105 |
| 2019/0132371 A1* | 5/2019 | Bhat | | G06F 3/04842 |
| 2019/0162769 A1 | 5/2019 | Zhao et al. | | |
| 2019/0163700 A1* | 5/2019 | Baumgardner | | H04L 9/0637 |
| 2019/0200013 A1* | 6/2019 | Wu | | H04N 19/164 |
| 2019/0202657 A1 | 7/2019 | Li et al. | | |
| 2019/0222897 A1* | 7/2019 | Frusina | | H04N 21/2343 |
| 2019/0260814 A1* | 8/2019 | Amini | | G06V 20/52 |
| 2019/0261370 A1 | 8/2019 | Amini et al. | | |
| 2019/0282897 A1* | 9/2019 | Posin | | A63F 13/35 |
| 2019/0364505 A1 | 11/2019 | Wang et al. | | |
| 2022/0122149 A1* | 4/2022 | Kim | | G06Q 30/0631 |
| 2022/0366622 A1* | 11/2022 | Brogger | | G06Q 10/0637 |
| 2023/0262234 A1* | 8/2023 | Amini | | H04N 19/42 |
| | | | | 709/219 |

FOREIGN PATENT DOCUMENTS

| | | | | | |
|---|---|---|---|---|---|
| CN | 105246131 A | | 1/2016 | | |
| CN | 106131580 A | * | 11/2016 | | H04L 1/0045 |
| CN | 106534634 A | | 3/2017 | | |
| CN | 106954026 A | | 7/2017 | | |
| CN | 110177393 A | | 8/2019 | | |
| CN | 110177835 A | | 8/2019 | | |
| JP | 2010232819 A | | 10/2010 | | |
| WO | 2006075052 A1 | | 7/2006 | | |
| WO | 2009048660 A2 | | 4/2009 | | |
| WO | WO-2013120432 A1 | * | 8/2013 | | H04N 19/172 |
| WO | WO-2014006997 A1 | * | 1/2014 | | H04N 19/70 |
| WO | WO-2019100204 A1 | * | 5/2019 | | H04N 19/103 |

OTHER PUBLICATIONS

Ananthanarayanan, Ganesh, et al., "Real-time Video Analytics—the killer app for edge computing", Microsoft Research; IEEE Computer Society, 11 pages.

Girshick, Ross, "Fast R-CNN Object detection with Caffe", Microsoft Research, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, 12 pages.

Chinese Office Action mailed Jul. 28, 2021, in Chinese Patent Application No. 201910135485.8, 10 pages.

* cited by examiner

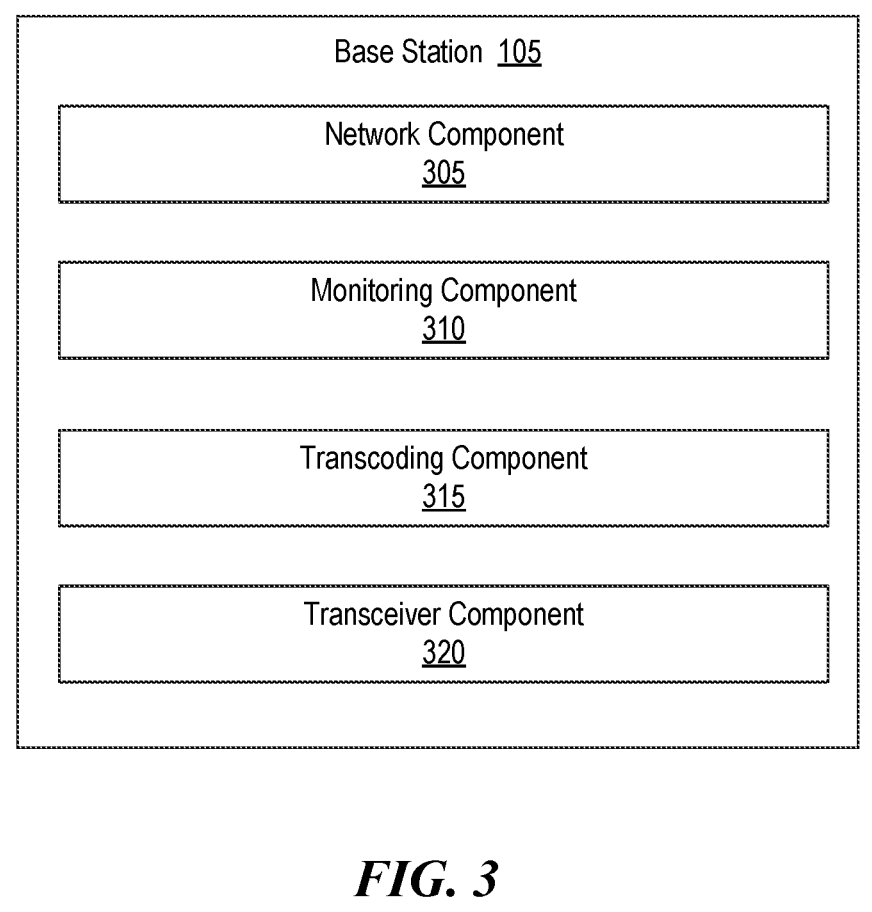

Base Station  105

Network Component
305

Monitoring Component
310

Transcoding Component
315

Transceiver Component
320

*FIG. 3*

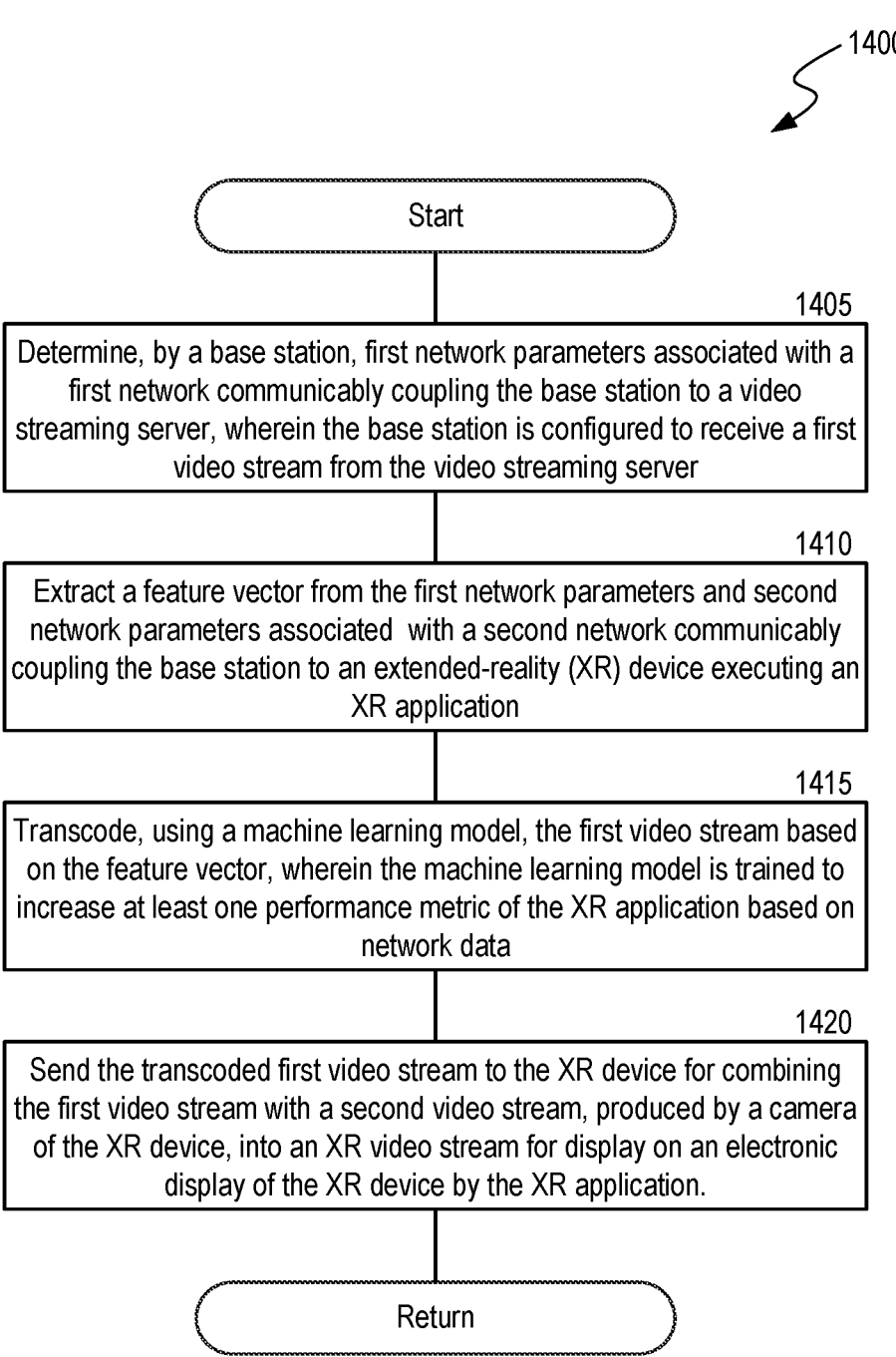

1400

Start

1405

Determine, by a base station, first network parameters associated with a first network communicably coupling the base station to a video streaming server, wherein the base station is configured to receive a first video stream from the video streaming server

1410

Extract a feature vector from the first network parameters and second network parameters associated with a second network communicably coupling the base station to an extended-reality (XR) device executing an XR application

1415

Transcode, using a machine learning model, the first video stream based on the feature vector, wherein the machine learning model is trained to increase at least one performance metric of the XR application based on network data

1420

Send the transcoded first video stream to the XR device for combining the first video stream with a second video stream, produced by a camera of the XR device, into an XR video stream for display on an electronic display of the XR device by the XR application.

Return

*FIG. 14*

TRANSCODING IN SECURITY CAMERA APPLICATIONS

CROSS-REFERENCE TO RELATED APPLICATION(S)

This application is a continuation-in-part application of U.S. patent application Ser. No. 17/345,204, entitled "TRANSCODING IN SECURITY CAMERA APPLICA-TIONS," filed on Jun. 11, 2021, which is a continuation application of U.S. patent application Ser. No. 15/994,270, entitled "TRANSCODING IN SECURITY CAMERA APPLICATIONS," filed on May 31, 2018, which claims the benefit of U.S. Provisional Patent Application No. 62/633,017, entitled "OPTIMIZATION AND TESTING OF WIRE-LESS DEVICES" filed on Feb. 20, 2018, all of which are incorporated by reference herein in their entirety.

TECHNICAL FIELD

The disclosure is related to transcoding a video stream captured from a security camera.

BACKGROUND

Transcoding is a process of decoding an encoded content and then altering the decoded content based on one or more requirement and encoding the altered content. As an example, using transcoding the audio and/or video format (codec) may be changed from one to another, such as converting from an MPEG2 source (commonly used in broadcast television) to H.264 video and AAC audio codes, which may be used for streaming. Other basic tasks could include adding watermarks, logos, or other graphics to your video. A video streaming service, such as a movie streaming service, uses transcoding to typically stream videos to dif-ferent types of user devices, such as smartphones, laptops, smart televisions (TVs). For example, if the content to be streamed is of a resolution 4K (ultra-high-definition), not all user devices may be capable streaming the content smoothly. The viewers without sufficient network bandwidth may not be able to view the stream as their players may be buffering the content constantly as they wait for packets of that 4K video to arrive or devices with lower resolution may not be able to the view the content at all. Accordingly, the video streaming service may transcode the content to generate multiple video streams of various bit rates or resolution, e.g., 1080p, 720p, and send the appropriate stream to the user devices.

However, the current transcoding techniques do not adapt to the change in environment, e.g., representative of various user device or network parameters, in which the streaming is performed. For example, consider a user would like to view a live video stream from a security camera installed at a home of the user on a user device such as a smartphone. When a data rate associated with a network to which the smartphone is connected decreases, the current techniques do not get a feedback of the change in data rate and therefore, continues with the streaming at a same bit rate or resolution of the video, which results in loss of video frames or video being jittery or stuck. That is, the current transcod-ing techniques are not optimized based on the dynamic nature of the environment. Further, the current transcoding techniques typically perform transcoding in a cloud server, which is typically in a network different from that of a source of the content, and that adds to the latency in streaming the content. The current transcoding techniques do not have the capability to perform the transcoding closer to the source of the content, e.g., in the same network, or at a device associated with a device that generates the content, and therefore, are inefficient.

SUMMARY

The disclosure is related to adaptive transcoding of video streams from a camera. A camera system includes a camera and a base station connected to each other in a first network, which can be a wireless local area network (WLAN). When a user requests for a video from the camera, the base station obtains a video stream from the camera, transcodes the video stream within the base station to generate a transcoded video stream, and transmits the transcoded video stream to a user device. The user device can be any computing device associated with the user, such as a smartphone, a laptop, a tablet personal computer (PC), or a smart TV.

The base station performs the transcoding based on one or more input parameters of an environment in which the video streaming is performed, such as network parameters asso-ciated with the first network, network parameters associated with a second network to which the user device is connected, parameters associated with the user device. The base station can also adapt the transcoding to a change in one or more of the input parameters. For example, if a speed, e.g., a data rate, of the second network decreases from a first bit rate to a second bit rate, the base station can automatically learn of the decrease in the speed of the second network, and transcode the video stream by decreasing a resolution and/or bit rate of the video stream to generate an adjusted transcoded video stream. Similarly, the transcoding can increase the resolution and/or the bit rate back up when the speed of the second network improves. While speed of the second network is one of the input parameters to which the transcoding can dynamically adapt, the transcoding can be adapt to various other input parameters, such as the ones mentioned above.

Further, the base station can also dynamically determine whether to stream the transcoded video stream directly to the user device, e.g., using a peer-to-peer (P2P) streaming technique, or via a video streaming server located in a cloud network based on streaming location factors. For example, if the base station determines that the user device is in the same network, e.g., LAN, as the base station or if a latency or a load associated with the video streaming server is above a specified threshold, the base station can stream the transcoded video stream to the user device using the P2P streaming technique. In another example, if the base station determines that the user device is in a network that does not support P2P streaming, or if the user device is experiencing data loss in receiving the video stream directly, the base station can transmit the transcoded video stream to the video streaming server for streaming to the user device.

Furthermore, the base station can also determine whether to perform the transcoding locally, e.g., at the base station, or using a server in a cloud network, based on transcoding location factors. For example, if the availability of resources at the base station, e.g., processing capacity, memory, for performing the transcoding is unavailable or below a speci-fied threshold, or if the transcoding to a particular require-ment, e.g., codec, is unavailable, the base station can deter-mine to have the video stream transcoded at the server in the cloud network. In another example, if the base station determines that a latency or a load associated with the server is above a specified threshold, or if there is a licensing cost associated with transcoding at the server or if the licensing cost is above a specified threshold, the base station can determine to transcode the video stream at the base station.

The base station can continuously monitor the input parameters, the streaming location factors, and the transcoding location factors, e.g., by obtaining feedback from the user device or an access point of the network to which the user device is connected, and dynamically adapt the transcoding based on the input parameters.

BRIEF DESCRIPTION OF THE DRAWINGS

FIG. 3 is a block diagram of the base station of FIG. 1A, consistent with various embodiments.

FIG. 14 is a flow diagram illustrating a process for transcoding in security camera applications, in accordance with one or more embodiments of this disclosure.

DETAILED DESCRIPTION

Figure 1A:
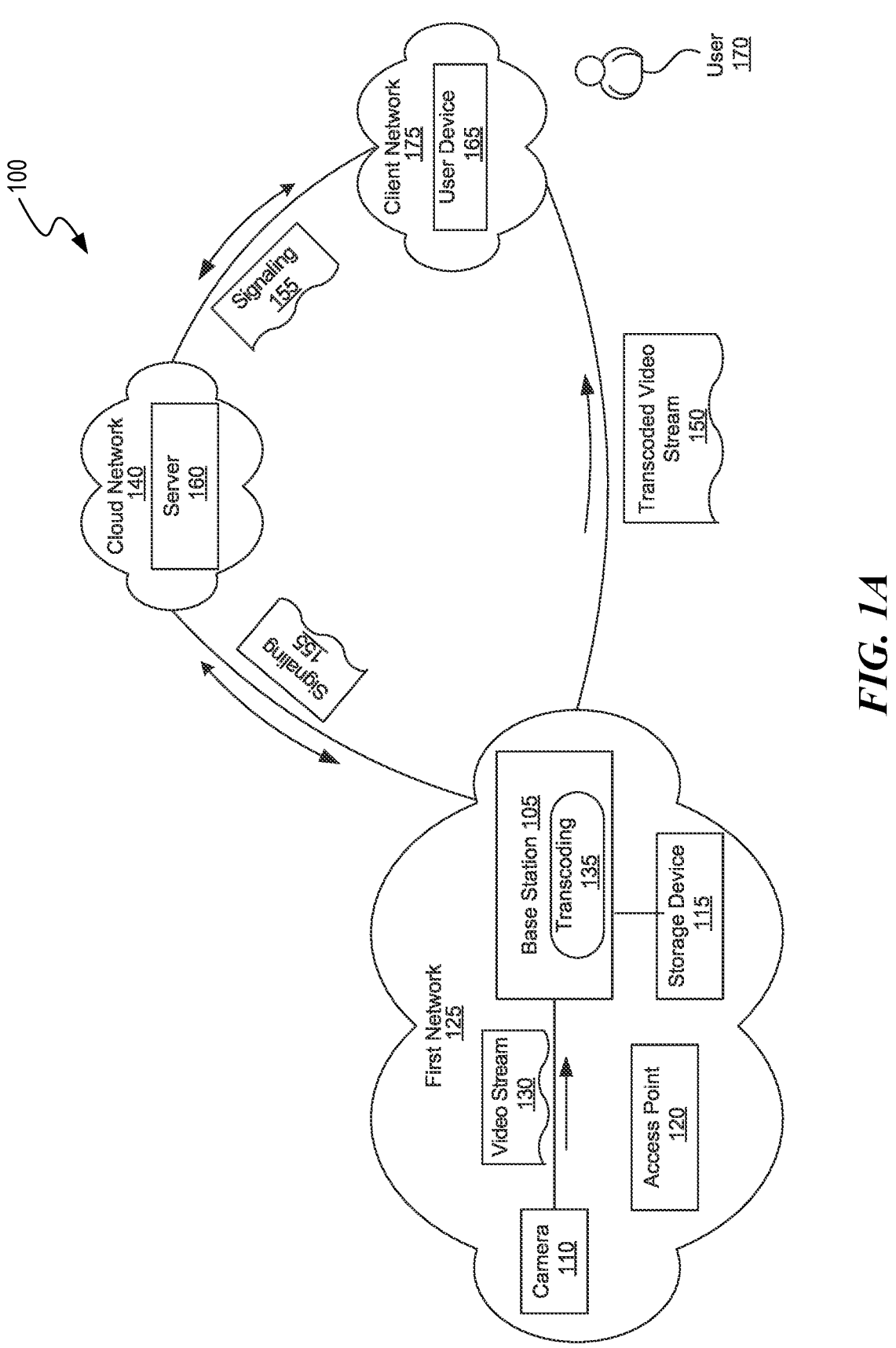
FIG. 1A is a block diagram illustrating an environment in which transcoding of a video stream in a camera system having a base station can be implemented.

FIG. 1A is a block diagram illustrating an environment in which transcoding of a video stream in a camera system having a base station can be implemented. The environment 100 includes a camera system having a base station 105 and a camera 110. In some embodiments, the camera system is a security camera system that can be installed in a building, e.g., a house. The base station 105 and the camera 110 can be connected to each other using a first network 125. The first network 125 can be a local area network (LAN). In some embodiments, the first network 125 is a wireless LAN (WLAN), such as a home Wi-Fi, created by an access point 120. The camera 110 and the base station 105 can be connected to each other wirelessly, e.g., over Wi-Fi, or using wired means. The base station 105 and the camera 110 can be connected to each other wirelessly via the access point 120, or directly with each other without the access point 120, e.g., using Wi-Fi direct, Wi-Fi ad hoc or similar wireless connection technologies. Further, the base station 105 can be connected to the first network 125 using a wired means or wirelessly.

The camera 110 captures video and transmits the video to the base station 105 as a video stream 130. The camera 110 can encode the video stream 130 using any codec, e.g., H.264. Further, a file format of the video stream 130 can be one of many formats, e.g., AVI, MP4, MOV, WMA, or MKV. The video stream 130 can include audio as well if the camera 110 has audio capabilities, e.g., a speaker and/or a microphone. The camera 110 can be battery powered or powered from a wall outlet. The camera 110 can include one or more sensors, e.g., a motion sensor that can activate the recording of the video when a motion is detected. The camera 110 can include infrared (IR) light emitting diode (LED) sensors, which can provide night-vision capabilities. Although the environment 100 illustrates a single camera 110, the camera system can include multiple cameras (which can be installed at various locations of a building). Further, all the cameras in the camera system can have same features, or at least some of the cameras can have different features. For example, one camera can have a night-vision feature while another may not. One camera can be battery powered while another may be powered from the wall outlet.

The base station 105 can be a computer system that securely connects the camera 110 to the Internet via the access point 120. The base station 105 can provide various features such as long range wireless connectivity to the camera 110, a local storage device 115, a siren, connectivity to network attached storage (NAS), and enhance battery life of the camera 110, e.g., by making the camera 110 work efficiently and keeping the communications between the base station 105 and the camera 110 efficient. The base station 105 can be configured to store the video captured from the camera 110 in any of the local storage device 115, the NAS, or a cloud storage service. The base station 105 can be configured to generate a sound alarm from the siren when an intrusion is detected by the base station 105 based on the video stream 130 receive from the camera 110.

Another feature of the base station 105 is that it can create its own network within the first network 125, so that the camera 110 may not overload or consume the network bandwidth of the first network 125. The camera 110 typically connects to the base station 105 wirelessly. The first network 125 can include multiple base stations to increase wireless coverage of the base station 105, which may be beneficial or required in cases where the cameras are spread over a large area.

When a user 170 sends a request, e.g., from a user device 165, to view a live video feed from the camera 110, the base station 105 receives the request and in response to receiving the request, obtains the video stream 130 from the camera 110, transcodes 135 the video stream 130 to generate a transcoded video stream 150, and streams the transcoded video stream 150 to the user device 165. Upon receiving the transcoded video stream 150 at the user device 165, a video player application in the user device 165 decodes the transcoded video stream 150 and plays the video on a display on the user device 165 for the user 170 to view. The user device 165 can be any computing device that can connect to a network and play video content, such as a smartphone, a laptop, a desktop, a tablet personal computer (PC), or a smart TV.

Although the video stream 130 is described as a live or real-time video stream from the camera 110, the video stream 130 is not limited to real-time video stream, it can be a video stream retrieved from the storage device 115, the NAS or the cloud storage service.

The base station 105 can stream the transcoded video stream 150 to the user device 165 in multiple ways. For example, the base station 105 can stream the transcoded video stream to the user device 165 using P2P streaming technique. In P2P streaming, when the video player on the user device 165 requests the video stream 130, the base station 105 and the user device 165 continuously exchange signaling information 155 via a server 160 in a cloud network 140 to determine the location information of the base station 105 and the user device 165 for each other, to find a best path and establish a connection to route the transcoded video stream 150 from the base station 105 to the user device 165. After establishing the connection, the base station 105 streams the transcoded video stream 150 to the user device 165, eliminating the additional bandwidth cost to deliver the transcoded video stream 150 from the base station 105 to a video streaming server in the cloud network 140 and for streaming from the video streaming server to the user device 165. The server 160 keeps a log of available peer node servers to route the video stream and establishes the connection between the user device 165 and the peers. The server 160 is a signaling server or can include signaling software whose function is to maintain and manage a list of peers and handle the signaling 155 between the base station 105 and the user device 165. In some embodiments, the server 160 can dynamically select the best peers based on geography and network topology.

In some embodiments, the cloud network 140 is a network of resources from a centralized third-party provider using Wide Area Networking (WAN) or Internet-based access technologies. Cloud networking is related the concept of cloud computing, in which the network or computing resources are shared across various customers or clients. The cloud network 140 is distinct, independent, and different from that of the first network 125.

Figure 1B:
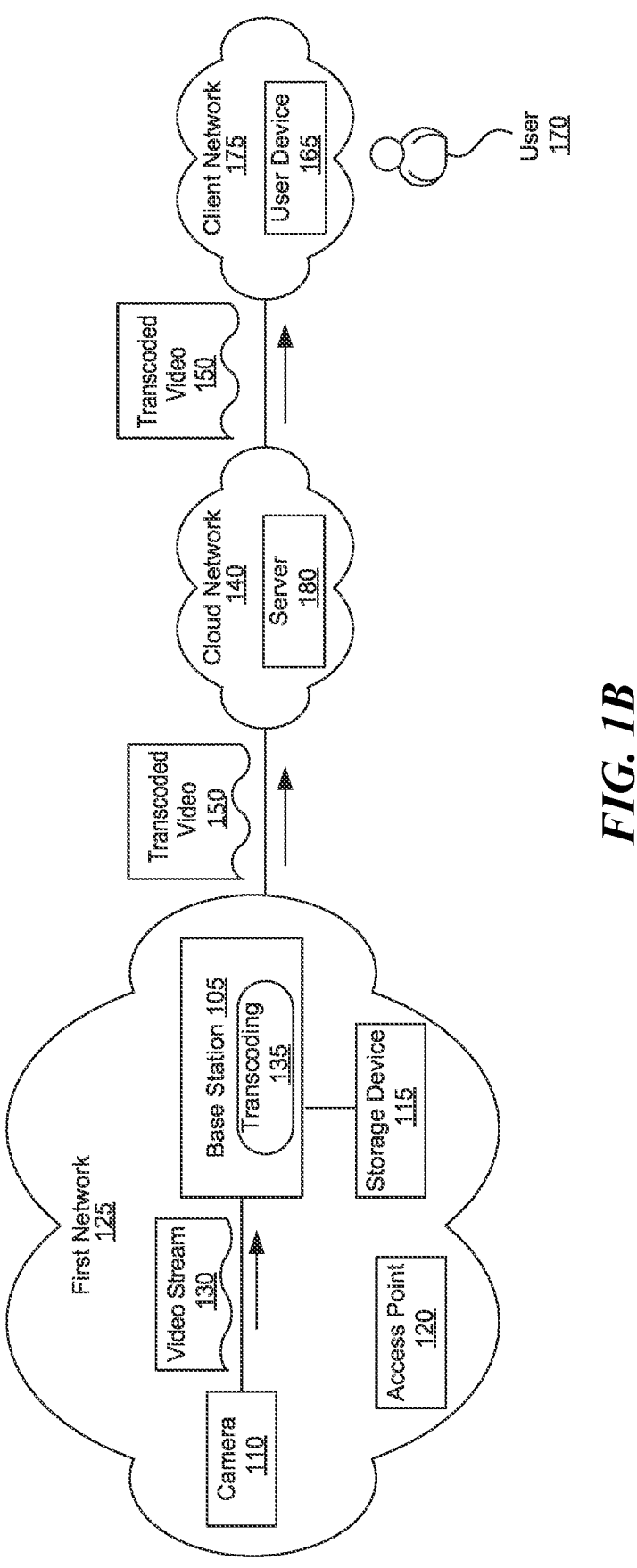
FIG. 1B is a block diagram illustrating streaming of a transcoded video stream via a cloud network, consistent with various embodiments.

In another example of streaming the video to the user device 165, the base station 105 can stream the transcoded video stream 150 to the user device 165 via a video streaming server 180 in the cloud network 140 as illustrated in FIG. 1B. FIG. 1B is a block diagram illustrating streaming of a transcoded video stream via a cloud network, consistent with various embodiments. When the video player on the user device 165 requests the video stream 130, the base station 105 uploads the transcoded video stream 150 to the video streaming server 180 in the cloud network 140, which further streams the transcoded video stream 150 to the user device 165. The user device 165 maintains a continuous connection with the video streaming server 180 to receive the transcoded video stream 150.

The transcoded video stream 150 can be streamed from the base station 105 or from the video streaming server 180. The base station 105 can determine the "streaming from" location, e.g., the base station 105 or the video streaming server 180, based on a streaming location parameter. The streaming location parameter is evaluated based on one or more streaming location factors and is evaluated to one of two values, e.g., Boolean values such as true or false, 0 or 1, "LOCAL" or "REMOTE," etc. If the base station 105 determines that the streaming location parameter is of a first value, e.g., LOCAL, then the streaming is performed from the base station 105. However, if the streaming location parameter is of a second value, e.g., REMOTE, then the base station 105 instructs the video streaming server 180 to perform the streaming. Note that the evaluation function can consider one streaming location factor or a combination of streaming location factors in determining the value. Also, in some embodiments, the user 170 may customize the evaluation function to determine a specific value for specific combination of streaming location factors.

The streaming location parameter is evaluated based on one or more streaming factors, which include user device parameters such as a location of the user device 165; network parameters of the cloud network 140 such as a latency of with the video streaming server 180, a load associated with the video streaming server 180; network parameters associated with the client network 175 such as whether the client network 175 permits P2P streaming, etc. For example, if the base station 105 determines that the user device 165 is in the first network 125, the base station 105 determines the streaming location parameter to be "LOCAL," which indicates that the base station 105 streams the transcoded video stream 150 to the user device 165, e.g., using P2P streaming technique. In another example, if the base station 105 determines that a latency or load associated with the video streaming server 180 is above a specified threshold, the base station 105 determines the streaming location parameter to be "LOCAL". In another example, if the base station 105 determines that the client network 175 to which the user device 165 is connected does not support P2P streaming, the base station 105 determines the streaming location parameter to be "REMOTE," which indicates that the base station 105 has instructed the video streaming server 180 to stream the transcoded video stream 150. In another example, if the user device 165 is experiencing data loss in receiving the transcoded video stream 150 directly from the base station 105, the base station 105 determines the streaming location parameter to be "REMOTE".

In some embodiments, the base station 105 can dynamically determine the "streaming from" location. That is, the base station 105 can continuously monitor the streaming location factors, evaluate the streaming location parameter, and update the "streaming from" location as and when the streaming location parameter changes.

Referring to the transcoding 135, the base station 105 performs the transcoding 135 so that the transcoded video stream 150 is in a form that is suitable for transmission to and consumption by the user device 165. That is, the transcoding 135 converts the video stream 130 from a first form to a second form. Different user devices can have different hardware or software capabilities. For example, the user 170 can have a first user device with a first resolution, e.g., 4K resolution (e.g., 3840 pixels×2160), and a second user device with a second resolution, e.g., 720p (e.g., 1280×720). If the video stream 130 streamed is of 4K resolution, the video stream 130 may not be viewable on the second user device which is of a lower resolution. Similarly, if a data rate of the client network 175 is of a first data rate, e.g., 3 Mbps, and if the video stream 130 streamed to the user device is of 4K resolution at 13 Mbps, the video stream 130 may not be playable or may constantly buffer at the user device 165. Accordingly, the base station 105 determines to perform the transcoding 135 based on one or more input parameters, such as user device parameters, server parameters, network parameters associated with the first network 125, network parameters associated with the cloud network 140, and network parameters associated with the client network 175, to generate the transcoded video stream 150 that is in a form suitable for transmission to and consumption by the user device 165.

Continuing with the above example of user devices having two different resolutions, if the second user device having 720p resolution requests the video stream 130, the transcoding 135 transcodes the video stream 130 to change the resolution of the video from 4K (first form) to 720p (second form) and generates the transcoded video stream 150 having the video at the 720p resolution. If the user 170 requests the video stream 130 from multiple user devices simultaneously, the transcoding 135 can generate multiple transcoded video streams 150, one stream at 4K resolution for a 4K resolution user device and another stream at 720p resolution for 720p resolution device.

As another example of transcoding based on user device parameters, if the video stream 130 from the camera 110 is of MPEG2 format, but the user device 165 supports H.264 and AAC codec, the transcoding 135 can convert the video stream from the MPEG2 format (first form) to H.264 video and AAC audio (second form).

As an example of transcoding based on network parameters associated with the first network 125, the transcoding 135 can transcode the video stream 130 based on a data rate, e.g., uplink data rate of the first network 125. In some embodiments, the uplink data rate of the first network 125 is a data rate at which data can be uploaded from a device the first network 125 to another device outside of the first network 125. The transcoding 135 can transcode the video stream 130 to a data rate not higher than the uplink data rate of the first network 125. For example, if the uplink data rate is a maximum of 6 Mbps and if the source video stream 130 is of 4K resolution at 13 Mbps (first form), the transcoding 135 can transcode the video stream 130 to ensure that the transcoded video stream 150 has bit rates not exceeding the uplink data rate by a specified threshold (which is user configurable), e.g., Full-HD resolution at 6 Mbps, or other renditions at 3 Mbps, 1.8 Mbps, 1 Mbps, 600 kbps etc. (second form).

As an example of transcoding based on network parameters associated with the client network 175, the transcoding 135 can transcode the video stream 130 based on a data rate, e.g., downlink data rate of the first network 125. In some embodiments, the downlink data rate of the client network 175 includes a data rate at which data can be downloaded by a device in the client network 175. The transcoding 135 can transcode the video stream 130 to a data rate not higher than the downlink data rate of the client network 175. For example, if the downlink data rate is a maximum of 6 Mbps and if the source video stream 130 is of 4K resolution at 13 Mbps, the transcoding 135 can transcode the video stream 130 to ensure that the transcoded video stream 150 has bit rates not exceeding the downlink data rate by a specified threshold (which is user configurable), e.g., Full-HD resolution at 6 Mbps, or other renditions at 3 Mbps, 1.8 Mbps, 1 Mbps, 600 kbps etc.

As another example of transcoding based on network parameters associated with the client network 175, the transcoding 135 can transcode the video stream 130 based on a type of the client network 175. For example, if the client network 175 is a metered connection such as a cellular data connection, the user 170 may want to minimize the usage of data, and the transcoding 135 can transcode the video stream 130 to a lower resolution to minimize the data consumption. Continuing with the example, if the source video stream 130 is of 4K resolution, the transcoding 135 can transcode the video stream 130 to a lower resolution such as Full-HD or HD.

The base station 105 can also adapt the transcoding 135 dynamically based on the input parameters. That is, the base station 105 continuously monitors the input parameters, and changes the transcoding 135 (if necessary) if there is a change in one or more of the input parameters. For example, if the downlink data rate of the client network 175 changes beyond a specified threshold, e.g., decreases from a first bit rate to a second bit rate, the base station 105 can automatically learn of the decrease in the downlink data rate, and transcode the video stream 130 by decreasing a resolution and/or bit rate of the video stream 130 to generate an adjusted transcoded video stream. Similarly, the base station 105 can have the transcoding 135 increase the resolution and/or the bit rate back up when the downlink rate of the client network 175 improves beyond a specified threshold. In another example, as the availability of memory on an access point of the client network 175 to which the user device 165 is connected decreases, the base station 105 can have the transcoding 135 decrease the bit rate of the video stream 130 from a first bit rate to a second bit rate, since the access point may not be able to buffer enough data packets.

The base station 105 can monitor the input parameters using various means. For example, the base station 105 can obtain network parameters associated with the client network 175 from an access point of the client network 175 through which the user device 165 is connected. The network parameters can include a data rate of the client network 175, a load of the client network 175, a latency of the client network 175, memory availability at the access point. In another example, the base station 105 can obtain network parameters associated with the client network 175 and user device parameters from an app, such as a video player that plays the video stream, installed at the user device 165. The app can identify device parameters such as a type of the user device 165, a resolution of the user device 165, a type of the operating system of the user device 165, and other hardware and software capabilities of the user device 165. The app can also provide information such as a time of arrival of data packets of the transcoded video stream 150 at the user device 165, any loss in data packets, which can be analyzed by the base station 105 to determine or derive various network patterns such as any delay in receipt of the data packets, any congestion in the client network 175, a latency of the client network 175, etc., which can then be used to transcode the video stream 130 accordingly.

Transcoding the video stream 130 at the base station 105 can have various advantages (which are described in the following paragraphs). However, the transcoding 135 is not limited to being performed in the base station 105. The base station 105 can have the transcoding 135 performed in the video streaming server 180 of the cloud network 140, as illustrated in FIG. 2.

Figure 2:
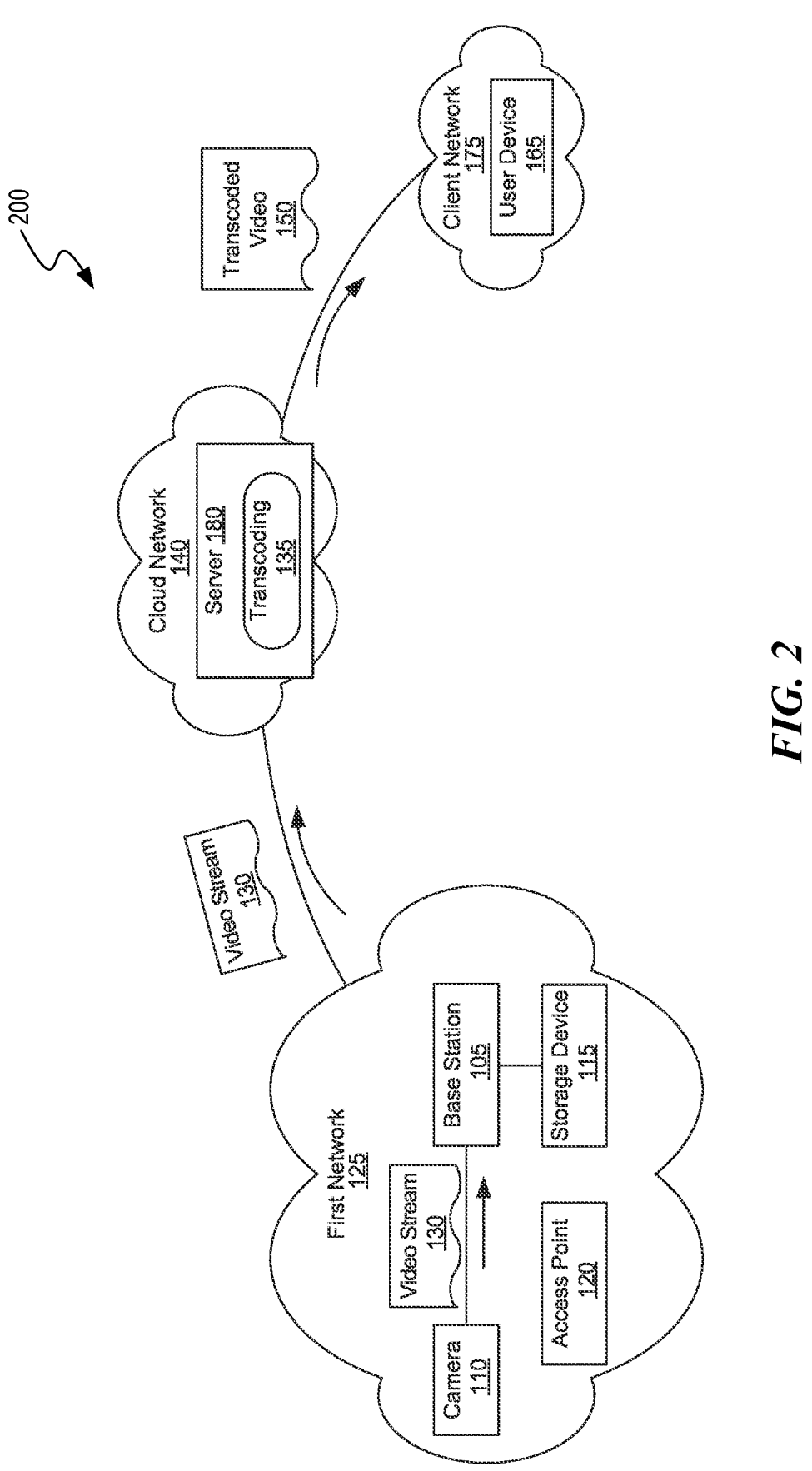
FIG. 2 is a block diagram of an example in the which transcoding of a video stream is performed in a video streaming server in a cloud network, consistent with various embodiments.

FIG. 2 is a block diagram of an example 200 in which transcoding of a video stream is performed in a video streaming server in a cloud network, consistent with various embodiments. In the example 200, when the video player on the user device 165 requests the video stream 130, the base station 105 uploads the video stream 130 to the video streaming server 180 in the cloud network 140, which performs the transcoding 135 of the video stream 130 to generate the transcoded video stream 150 and further streams the transcoded video stream 150 to the user device 165. The user device 165 maintains a continuous connection with the video streaming server 180 to receive the transcoded video stream 150. The input parameters based on which the transcoding 135 is performed is determined by the video streaming server 180, base station 105 or both.

The base station 105 can dynamically determine the "transcode at" location, e.g., base station 105 or the video streaming server 180, based on a transcoding location parameter. The transcoding location parameter is evaluated based on one or more transcoding location factors and is evaluated to one of two values, e.g., Boolean values such as true or false, 0 or 1, "LOCAL" or "REMOTE," etc. If the base station 105 determines that the transcoding location parameter is of a first value, e.g., LOCAL, the transcoding 135 is performed at the base station 105, and if the transcoding location parameter is of a second value, e.g., REMOTE, the base station 105 instructs the video streaming server 180 to perform the transcoding 135. The transcoding location parameter is determined based on one or more transcoding location factors, which include parameters associated with the base station 105 such as hardware or software capabilities of the base station 105; parameters associated with the video streaming server 180 such as a latency, load or a location of the video streaming server 180, a licensing cost associated with the transcoding at the video streaming server 180; user device parameters such as a location of the user device 165; network parameters associated with the client network 175 such as whether the client network 175 supports P2P streaming, etc.

For example, if the base station 105 determines that the base station 105 has a hardware transcoding component, or availability of resources such as processing capacity, memory, is above a specified threshold, then the base station 105 determines the transcoding location parameter as "LOCAL," which indicates that the transcoding 135 is performed at the base station 105. In another example, if the base station 105 determines that a latency or a load associated with the video streaming server 180 is above a specified threshold, if there is a licensing cost associated with the transcoding 135 at the video streaming server 180, or if the licensing cost is above a specified threshold, the base station 105 determines the transcoding location parameter as "LOCAL." In yet another example, if the base station 105 determines that the user device 165 is located in (a) the same network as the base station 105, e.g., the first network 125, or (b) a network in which the latency between the base station 105 and the user device 165 is lesser than a latency between the video streaming server 180 and the user device 165, the base station 105 determines the transcoding location parameter as "LOCAL."

If the base station 105 determines that resources, such as a processing capacity, a memory, are unavailable, or their availability is below a specified threshold for performing the transcoding 135, the base station 105 determines the transcoding location parameter as "REMOTE," which indicates that the base station 105 would instruct the video streaming server to perform the transcoding 135. In another example, if the base station 105 determines that base station 105 does not satisfy a particular transcoding requirement, e.g., a specified codec is unavailable, the base station 105 determines the transcoding location parameter as "REMOTE." In another example, if the base station 105 determines that a latency or a load associated with the video streaming server 180 is below a specified threshold, if there is no licensing cost associated with the transcoding 135 at the video streaming server 180, or if the licensing cost is below a specified threshold, the base station 105 determines the transcoding location parameter as "REMOTE." In yet another example, if the base station 105 determines that the client network 175 does not permit P2P streaming, the base station 105 determines the transcoding location parameter as "REMOTE."

The base station 105 can continuously monitor the transcoding location factors, e.g., by obtaining feedback from the user device 165, from the video streaming server 180, or an access point of the client network 175, determine the transcoding location parameter, and dynamically adapt the transcode at location based on the transcoding location parameter. For example, while the base station 105 is transcoding 135 a first portion of the video stream 130 at the base station 105, it can determine that the transcoding location parameter has changed, and therefore, instruct the video streaming server 180 to transcode the next portion or a remaining portion of the video stream 130.

The video streaming server 180 can be one server which performs both the transcoding 135 of the video stream 130 and streaming of the transcoded video stream 150, or can be more than one server in the cloud network 140—one server transcoding 135 of the video stream 130 and another server streaming the transcoded video stream 150.

FIG. 3 is a block diagram of the base station of FIG. 1A, consistent with various embodiments. The base station 105 has multiple components including a network component 305, a monitoring component 310, a transcoding component 315, and a transceiver component 320. The network component 305 establishes the connection with the first network 125, and between the base station 105 and the camera 110.

The monitoring component 310 monitors various parameters, such as input parameters that can be used in determining a form to which the video stream 130 is to be transcoded; streaming location parameter that can be used to determine the streaming from location, transcoding location parameter that can be used to determine the transcode at location.

The transcoding component 315 performs the transcoding 135 of the video stream 130 from a first form to a second form based on one or more of the input parameters.

The transceiver component 320 receives a video stream from the camera 110. The transceiver component 320 can store video streams at and/or retrieve the video streams from various storage sites such as the storage device 115, NAS or a cloud storage service. The transceiver component 320 can receive user requests for live video streams from the camera 110 or recorded video streams stored at the various storage sites and transmit them to the users.

Additional details of the foregoing components are described at least with reference to FIGS. 4-6 below. Note that the base station 105 illustrated in FIG. 3 is not restricted to having the above components. The base station 105 can include lesser number of components, e.g., functionalities of two components can be combined into one component, or can include more number of components, e.g., components that perform other functionalities. In some embodiments, the functionalities of one or more of the above components can be split into two or more components. Furthermore, the components of the base station 105 can be implemented at a single computing device or distributed across multiple computing devices.

Figure 4:
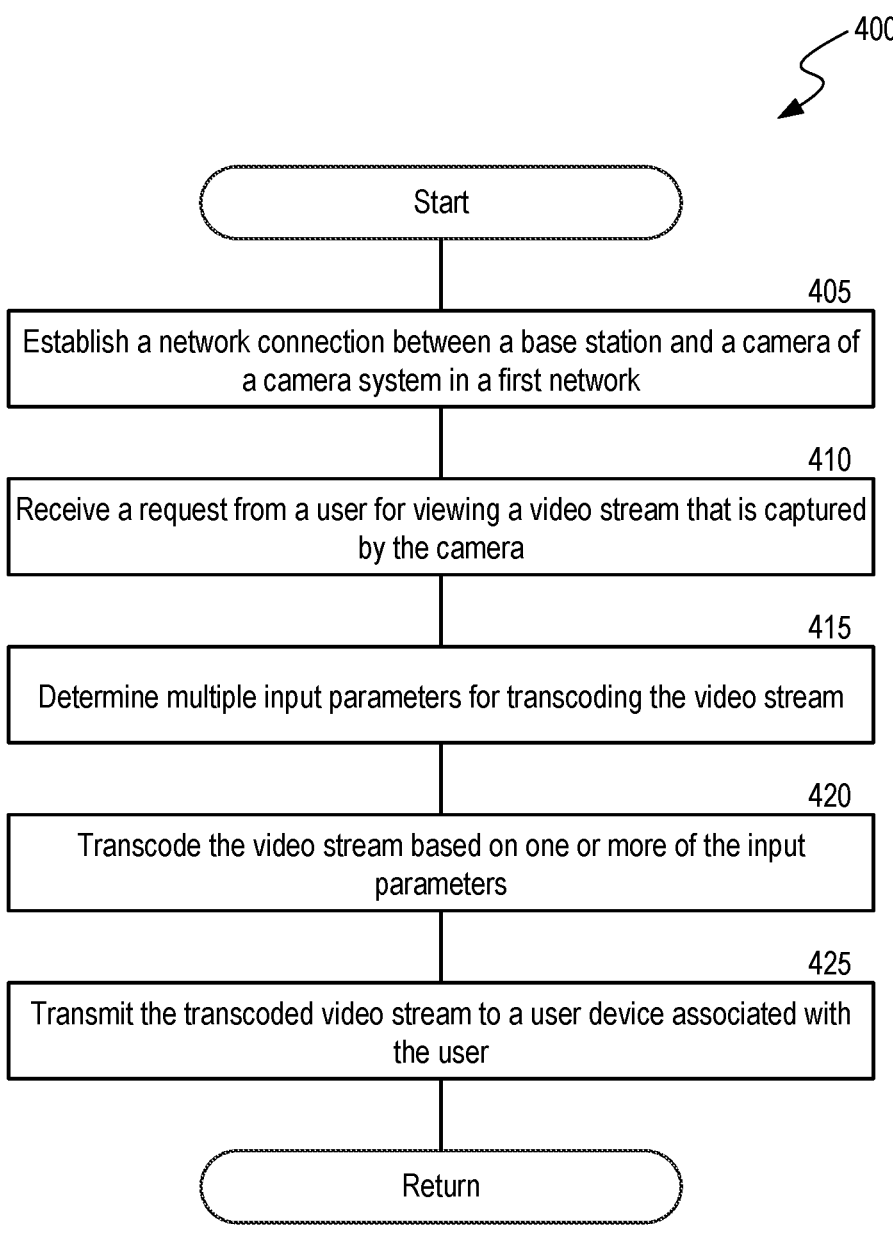
FIG. 4 is a flow diagram of a process for transcoding a video stream in a camera system having a base station, consistent with various embodiments.

FIG. 4 is a flow diagram of a process 400 for transcoding a video stream in a camera system having a base station, consistent with various embodiments. In some embodiments, the process 400 can be implemented using the base station 105 of FIG. 1A. At block 405, the network component 305 establishes a network connection between the base station 105 and the camera 110 in the first network 125. For example, the network component 305 can connect the base station 105 to the first network 125, either wirelessly or using wired means, discover the camera 110 in the first network 125 and connect to the camera 110, again either wirelessly or using wired means.

At block 410, the transceiver component 320 receives a request from the user 170 for a video stream 130 that is captured using the camera 110. The video stream 130 can be a real-time video stream from the camera 110 or a recording that is stored at one of the various storage sites. The video stream 130 can also include audio data.

At block 415, the monitoring component 310 determines multiple input parameters that may be used in determining to which form the video stream 130 is to be transcoded. The input parameters can include user device parameters, server parameters, network parameters associated with the first network 125, network parameters associated with the cloud network 140, and network parameters associated with the client network 175. The monitoring component 310 can also monitor streaming location parameter that can be used to determine the streaming from location and transcoding location parameter that can be used to determine the transcode at location.

At block 420, the transcoding component 315 transcodes the video stream 130 from a first form to a second form based on one or more of the multiple input parameters. For example, if the video stream is of 4K resolution and the user device 165 requesting the video stream 130 has a display with 720p resolution, the transcoding component 315 transcodes the video stream 130 from 4K to 720p by generating the transcoded video stream 150 at the 720p resolution. It should be noted that the transcoding 135 can either be performed at the base station 105 by the transcoding component 315, or by a video streaming server 180 in the cloud network 140. The base station can make the decision of the transcode at location based on the transcoding location parameter.

At block 425, the transceiver component 320 can transmit the transcoded video stream 150 to the user device 165. The transceiver component 320 can either stream the transcoded video stream 150 to the user device 165 directly, e.g., using P2P streaming, or forward the transcoded video stream 150 to a video streaming server 180 in the cloud network 140 to stream the transcoded video stream 150 to the user device 165. The transceiver component 320 determines the streaming from location based on a value of the streaming location parameter, which is determined by the monitoring component 310 based on one or more streaming location factors.

The transcoded video stream 150 can be streamed using one of many transport protocols, such as HTTP Live Streaming, Dynamic Adaptive Streaming Over HTTP (DASH), Smooth Streaming, HTTP Dynamic Streaming (HDS), MPEG-DASH, WEBRTC or Progressive Download as backup plan. In some embodiments, streaming services such as Wowza can also be used for streaming the transcoded video stream 150.

Figure 5:
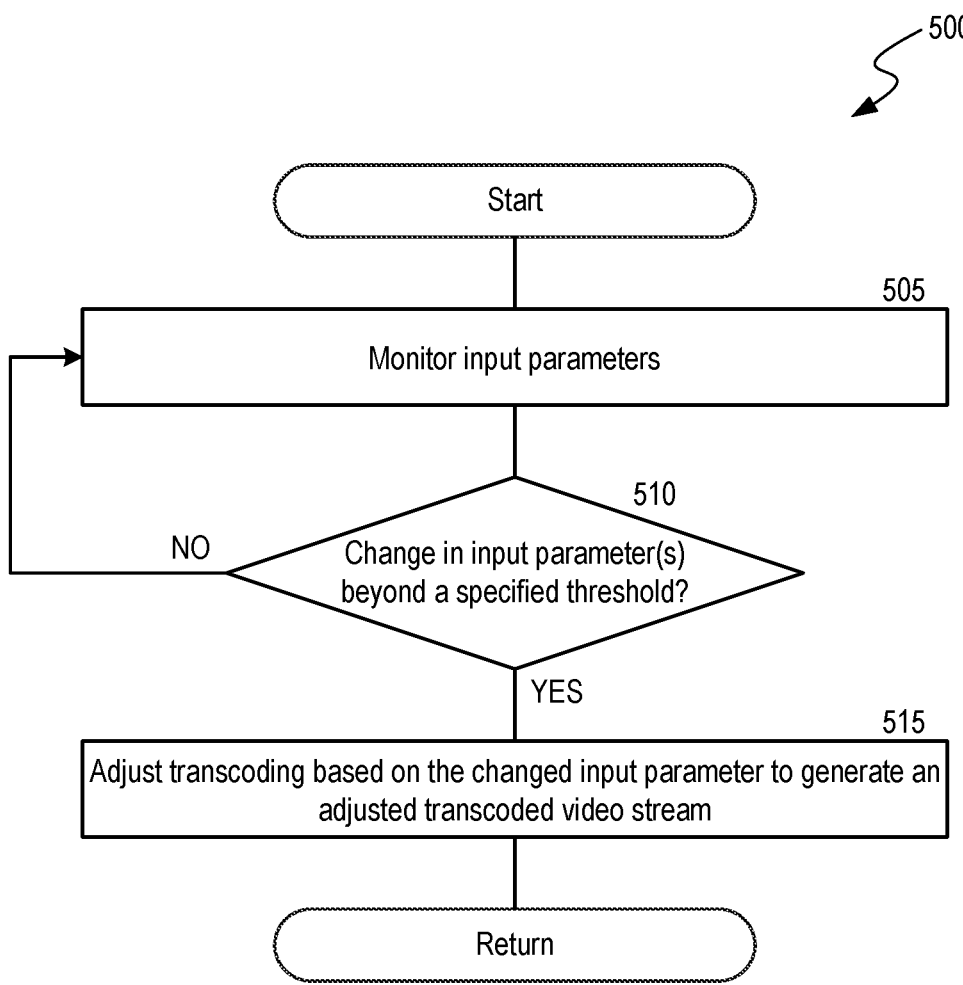
FIG. 5 is a flow diagram of a process for dynamically adapting the transcoding of a video stream, consistent with various embodiments.

FIG. 5 is a flow diagram of a process 500 for dynamically adapting the transcoding of a video stream, consistent with various embodiments. The process 500 may be executed using the base station 105 of FIG. 1A and can be executed as part of block 420 of process 400. At block 505, the monitoring component 310 continues to monitor the input parameters that may be used in determining to which form the video stream 130 is to be transcoded. The input parameters can include user device parameters, server parameters, network parameters associated with the first network 125, network parameters associated with the cloud network 140, and network parameters associated with the client network 175. The monitoring component 310 can obtain the input parameters from, or derive at least some of the input parameters based on the information obtained from, the user device 165, the video streaming server 180, or an access point of the client network 175.

At determination block 510, the monitoring component 310 determines whether any of the input parameters have changed beyond a specified threshold. In some embodiments, a user can define the threshold for a corresponding parameter.

If the monitoring component 310 determines that a specified input parameter has not changed beyond a specified threshold, the process 500 returns to block 505 where the monitoring component 310 continues to monitor the input parameters.

If the monitoring component 310 determines that the specified input parameter has changed beyond a specified threshold, at block 515, the transcoding component 315 adjusts the transcoding of the video stream 130 to generate an adjusted transcoded video stream. For example, consider that a downlink rate of the client network 175 is 15 Mbps and the transcoding component 315 is streaming a transcoded the video stream 130 at 4K resolution at 13 Mbps. If the monitoring component 310 determines that the downlink data rate of the client network 175 has changed beyond a specified threshold, e.g., decreased by more than 50% to 6 Mbps rate, the monitoring component 310 can automatically learn of the decrease in the downlink data rate, and instruct the transcoding component 315 to decrease a resolution and/or bit rate of the video stream 130 to Full HD at 6 Mbps. In response, the transcoding component 315 generates an adjusted transcoded video stream of Full HD resolution at 6 Mbps.

In some embodiments, the base station 105 can also instruct the camera 110 to modify one or parameters associated with the camera 110 based on feedback obtained by the base station 105. For example, the user 170 can provide feedback, e.g., using the app at the user device 165 which the user 170 uses to stream the video, indicating that night-vision images are not clear as the images are dark and the subject is not visible in the image. Upon receiving such feedback, the monitoring component 310 can either instruct the transcoding component 315 to enhance the video stream 130, e.g., by digitally increasing a gain, or instruct the camera 110 to enhance the video stream 130, e.g., by modifying one or more parameters associated with a sensor of the camera 110, such that the images in the video are brighter and the subject is visible. In another example, the user 170 can provide feedback indicating that the colors in the day-vision images are not appropriate or accurate. Upon receiving such feedback, the monitoring component 310 can either instruct the transcoding component 315 to enhance the video stream 130, e.g., by digitally processing the colors, or instruct the camera 110 to enhance the video stream 130, e.g., by changing the color mapping when encoding the video prior to transmission to the base station 105, such that the colors in the video have better accuracy. The base station 105 can not only dynamically adapt the transcoding based on the feedback, it can also modify the parameters of the camera 110 to capture images based on user preferences.

Figure 6:
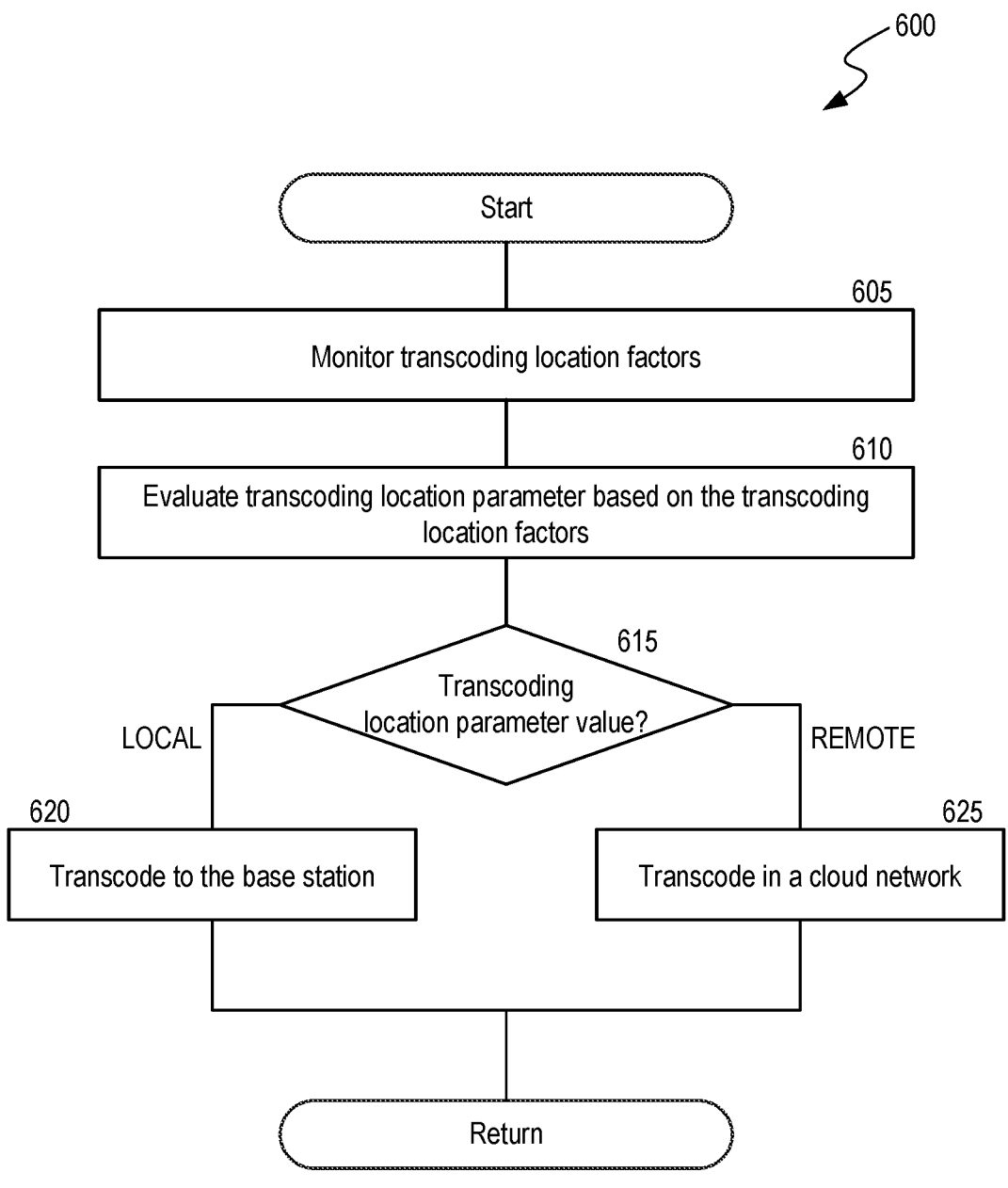
FIG. 6 is a flow diagram of a process for determining a transcoding location of a video stream, consistent with various embodiments.

FIG. 6 is a flow diagram of a process 600 for determining a transcoding location of a video stream, consistent with various embodiments. The process 600 may be executed in the base station 105 of FIG. 1A, and in some embodiments, as part of block 420 of process 400. At block 605, the monitoring component 310 monitors the transcoding location factors, which are described at least with reference to FIG. 2.

At block 610, the monitoring component 310 evaluates a transcoding location parameter based on the transcoding location factors. In some embodiments, the transcoding location parameter is evaluated to one of two values—"LOCAL" and "REMOTE"—in which the value "LOCAL," indicates that the transcoding 135 is performed at the base station 105, and the value "REMOTE" indicates that the transcoding is performed at the video streaming server 180. Note that the evaluation function can consider one factor or a combination of factors in determining the value. Also, in some embodiments, the user 170 may customize the evaluation function to determine a specific value for specific combination of factors.

At determination block 615, the monitoring component 310 determines whether the value of the transcoding location parameter is "LOCAL," or "REMOTE." For example, if the base station 105 determines that the base station 105 has a hardware transcoding module; availability of resources such as processing capacity, memory, is above a specified threshold; a latency or a load associated with the video streaming server 180 is above a specified threshold; if there is a licensing cost associated with the transcoding 135 at the video streaming server 180; if the licensing cost is above a specified threshold, the monitoring component 310 determines the transcoding location parameter as "LOCAL." If the monitoring component 310 determines that resources at the base station 105, such as a processing capacity, a memory, are unavailable, or their availability is below a specified threshold for performing the transcoding 135; that the base station 105 does not satisfy a particular transcoding requirement, e.g., a specified codec is unavailable, the base station 105 determines the transcoding location parameter as "REMOTE."

If the monitoring component 310 determines that a value of the transcoding location parameter is "LOCAL," at block 620, the monitoring component 310 instructs the transcoding component 315 to perform the transcoding 135.

On the other hand, if the monitoring component 310 determines that a value of the transcoding location parameter is "REMOTE," at block 625, the monitoring component 310 instructs the transceiver component 320 to transmit the video stream 130 to a video streaming server 180 in the cloud network 140 for performing the transcoding 135.

Figure 7:
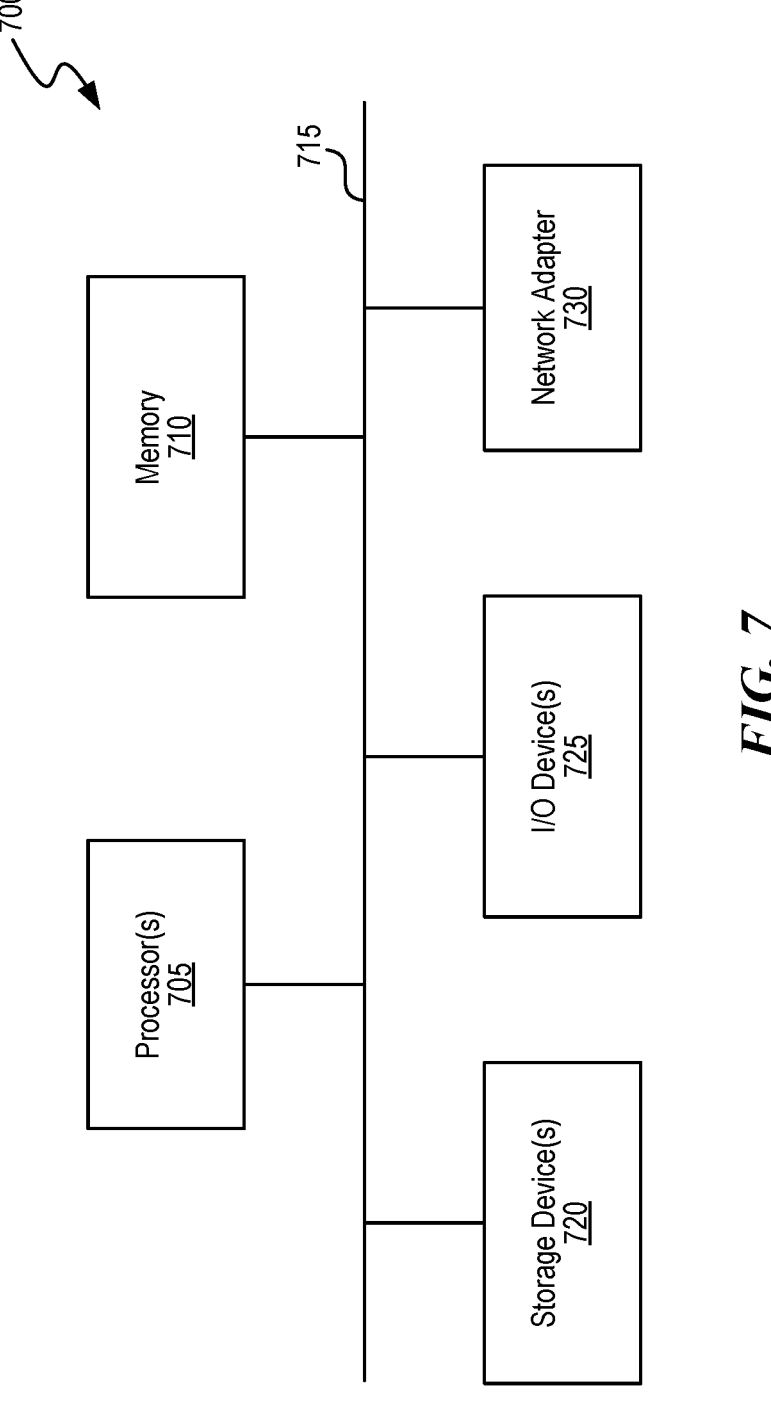
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Figure 8:
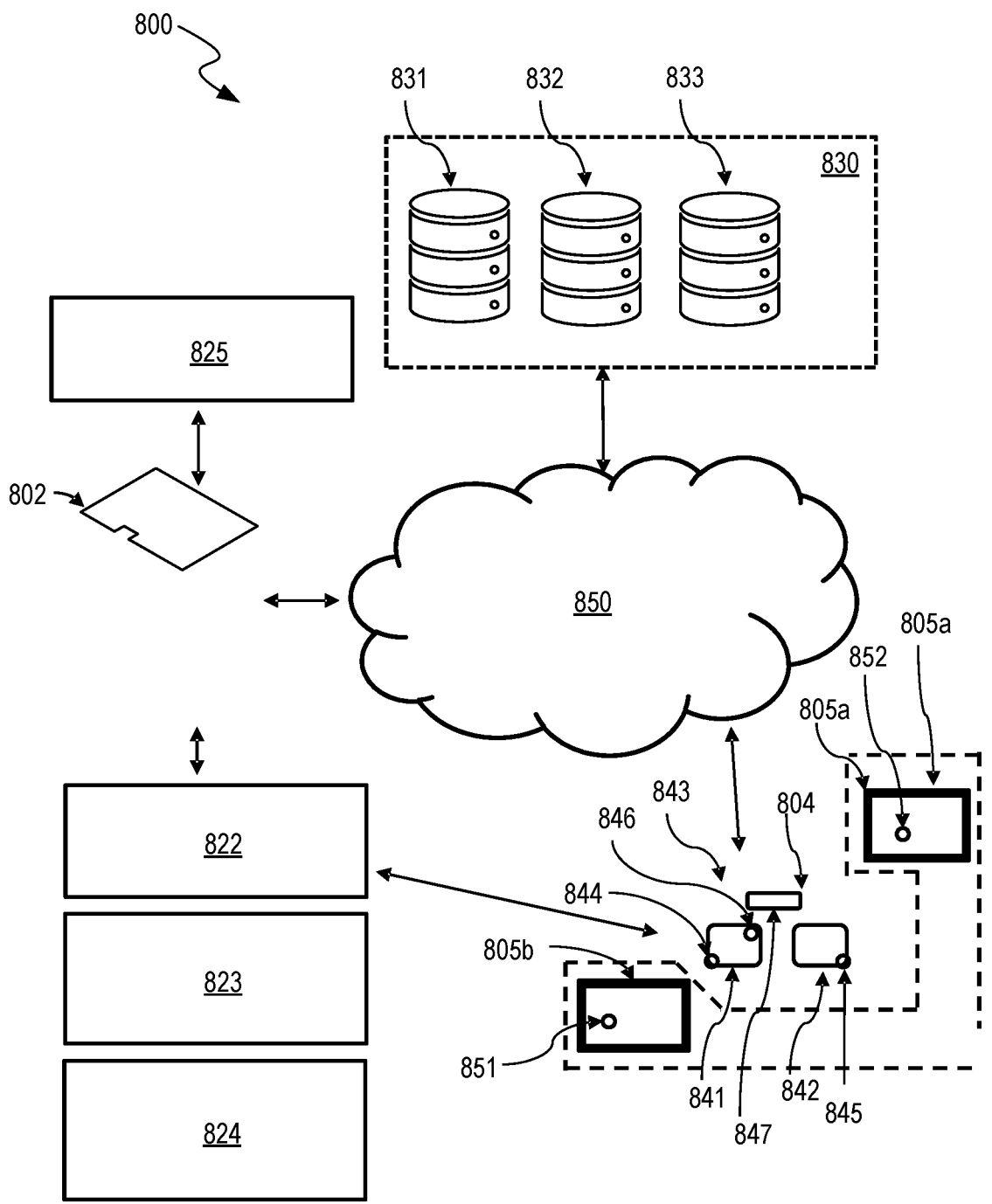
FIG. 8 illustrates an extended-reality (XR) system, in accordance with one or more embodiments.

FIG. 8 illustrates an extended-reality (XR) system 800, in accordance with one or more embodiments. Extended reality is a catch-all term to refer to augmented reality, virtual reality, and mixed reality. The technology is intended to combine or mirror the physical world with a "digital twin world" that is able to interact with each other. System 800 can be used to perform an XR computer-implemented method. For example, system 800 can be used in conjunction with determining network parameters associated with a network communicably coupling a base station to a video streaming server, receiving a video stream from the video streaming server, etc. Example network parameters, an example base station, and an example video streaming server are described in more detail with reference to FIGS. 1-6.

System 800 can be used to extract a feature vector from network parameters associated with a network (e.g., network 850) communicably coupling the base station to an XR device (e.g., wearable device 804) executing an XR application, transcode a video stream based on the feature vector, send the transcoded video stream to the XR device for combining the video stream with a second video stream into an XR video stream for display on an electronic display of the XR device by the XR application, or train machine learning (ML) systems. Transcoding of media is described in more detail with reference to FIGS. 1-6. An example ML system 1200 is illustrated and described in more detail with reference to FIG. 12.

System 800 can analyze system performance and then generate additional simulations based on the system performance to simulate the processes described herein any number of times. System 800 can remove, add, or modify actions based on, for example, system performance, user input, predicted events, outcomes, or the like. System 800 can generate an XR environment (e.g., an augmented reality (AR) environment or other environment) with displayed event information (e.g., mappings of moving objects), instrument data (e.g., instrument instructions, operational parameters, etc.), sensor data, user data (e.g., real-time behavior), and other information for assisting the user.

System 800 can include an AR device (e.g., wearable device 804) that provides virtual reality (VR) simulations for monitoring of behavior, activities, or other changing information. VR is a simulated experience that employs pose tracking and 3D near-eye displays to give the user an immersive feel of a virtual world. In some embodiments, system 800 generates an XR simulation environment that includes a digital environment model. The digital model is viewable by at least one user using an AR device, such as the devices illustrated and described in more detail with reference to FIGS. 8-9. The XR simulation environment is configured to enable the at least one user to virtually perform one or more steps on the digital model. For example, the user can identify behavior, activities, or other changing information when viewing a digital twin or a virtual model of the environment.

A different XR platform is used, and a different XR simulation environment is generated for different environment types, e.g., business, home, or mall. A different XR platform is used for each of the above because each platform has different modeling parameters. The modeling parameters can be retrieved from a modeling parameter library for generating a digital model.

Different ML models are used and trained differently for each XR simulation environment generated. For example, an ML model for a mall is trained using training data describing shopper activity, security personnel, movement of goods, traffic, etc. Different XR platforms are used because the error margins between features are different for different environment types. The granularity of features is different in different environments. Therefore, different VR modeling is performed for each environment type, and different software packages are designed.

VR training can also include identifying features (e.g., people or vehicles), equipment, vehicle positions, and other data to assist in monitoring of behavior, activities, or other changing information. User input (e.g., labels, position notes, or the like) can be collected (e.g., voice, keyboard, XR device input, etc.) during the simulations and then used to modify planned procedures, provide annotation during procedures using XR environments, or the like.

In some embodiments, system 800 receives feature mapping information from the at least one user via the XR device (e.g., VR device, AR device, etc.). In some embodiments, the same XR device is used to perform VR simulations to input mapping information and perform AR-assisted monitoring on the environment based on the mapping information. In other embodiments, different XR devices are used for training and performing the monitoring of behavior, activities, or other changing information. In some training procedures, multiple users input mapping information, which is aggregated to determine what information is correct. The aggregation can be used to determine confidence scoring for XR mapping. For example, a confidence score for AR mapping is based on a threshold percentage (e.g., at least 80%, 90%, 95%, or 99%) of the users providing the same mapping (e.g., mapping input using an XR environment).

In response to the confidence score reaching a threshold level for features associated with an environment, the mapping can be deployed for performing monitoring of behavior, activities, or other changing information. In AR/VR-assisted monitoring, wearable device 804 can display information to assist the user. The displayed information can include environmental information (e.g., instrument information, movement in a vicinity, or potential adverse events), and other information to assist the user. The user can move, add, or eliminate displayed information to enhance the experience. The configuration of the wearable device 804, information displayed, and feedback provided to the user can be selected based on procedures to be performed.

In some embodiments, system 800 performs confidence-score AR mapping to meet a confidence threshold for an environment. The confidence-score AR mapping includes selecting at least a portion of the mapping information for the AR mapping to the environment. The selected mapping information is mapped to the environmental features. Via the AR device, an AR environment is displayed to the at least one user. The AR environment includes the mapping of the selected mapping information to the features.

In some embodiments, the confidence threshold (e.g., 90%, 95%, or 99%) is selected based on an environmental type. Image/video data of the environment is segmented to identify digital features associated with the environment. For example, identification is performed using the ML system 1200 of FIG. 12. The digital features are part of the digital environment model. Via a VR device, one or more identification prompts are generated for receiving the environmental mapping information from the at least one user to label one or more discrete features viewed by the user. The discrete features associated with the environment can be identified using one or more ML algorithms.

The AR environment includes the mapping of the selected environmental mapping information to the environmental features. In some embodiments, the computer system maps at least some of the features of the environment using an ML platform. The ML platform includes a plurality of environment-type-specific ML modules to be applied to the image/video data of the environment to provide the environmental mapping. The environment-type-specific ML modules can be trained using environment-type grouped data sets, including environment-type mappings. Environment-type mappings can include layers based on the environment type. For example, a mall mapping can include layers showing features such as people, baggage, and vehicles. A home mapping can include layers showing landscaping, patios, walls, etc. The user can select layers, data sets, and mapping information to be added or removed from the environment-type data. For example, each platform includes a different feature extraction module, a different ML model, and different training methods.

System 800 includes a server (or other computer system 802), where such system 802 includes one or more non-transitory storage media storing program instructions to perform one or more operations of a projection module 822, a display module 823, or a feedback module 824. In some embodiments, system 800 includes wearable device 804, where the wearable device 804 may include one or more non-transitory storage media storing program instructions to perform one or more operations of the projection module 822, the display module 823, or the feedback module 824.

Wearable device 804 can be a VR headset, such as a head-mounted device that provides VR for the wearer. Wearable device 804 can be used in applications, including simulators and trainers for monitoring of behavior, activities, or other changing information. Wearable device 804 typically includes a stereoscopic display (providing separate images for each eye), stereo sound, and sensors like accelerometers and gyroscopes for tracking the pose of the user's head to match the orientation of the virtual camera with the user's eye positions in the real world. The user can be a security professional or a user laying an AR game. Wearable device 804 can also have eye-tracking sensors and controllers. Wearable device 804 can use head-tracking, which changes the field of vision as a user turns their head.

Wearable device 804 can include imagers, sensors, displays, feedback devices, controllers, or the like. The wearable device 804 can capture data, locally analyze data, and provide output to the user based on the data. A controller of the wearable device 804 can perform local computing (e.g., edge computing) with or without communicating with a remote server and can store edge computing ML libraries locally analyzing data to provide output. This allows onboard processing to be performed to avoid or limit the impact of, for example, network communications. Edge computing is a distributed computing paradigm that brings computation and data storage closer to the sources of data. This improves response times and saves bandwidth. Edge computing is an emerging computing paradigm which refers to a range of networks and devices at or near the user. Edge computing processes video data closer to the electronic devices, enabling processing at greater speeds and volumes, leading to greater action-led results in real time.

System 800 can include one or more wearable devices configured to be worn on other parts of the body. The wearable devices can include, for example, gloves (e.g., haptic feedback gloves or motion-tracking gloves), wearable glasses, loops, heart monitors, heart rate monitors, or the like. These wearable devices can communicate with components of the system 800 via wire connections, optical connections, wireless communications, etc. The wearable device 804 can also communicate with external sensors and equipment. The wearable device 804 can receive data (sensor output, equipment output, operational information for instruments, etc.) and display the received information to the user. This allows the user to view sensor data without turning their attention away from a monitoring site.

System 800 can include a set of external displays 805 (e.g., accessories of the wearable device 804, desktop monitors, television screens, or other external displays), where the set of external displays 805 may be provided instructions to display visual stimuli based on measurements or instructions provided by the wearable device 804 or the server 802. In some embodiments, the wearable device 804 may communicate with various other electronic devices via a network 850, where the network 850 may include the Internet, a local area network, a peer-to-peer network, etc.

The wearable device 804 may send and receive messages through the network 850 to communicate with a server 802, where the server 802 may include one or more non-transitory storage media storing program instructions to perform one or more operations of a statistical predictor 1525. It should further be noted that while one or more operations are described herein as being performed by particular components of the system 800, those operations may be performed by other components of the system 800 in some embodiments. For example, operations described in this disclosure as being performed by the server 802 may instead be performed by the wearable device 804, where program code or data stored on the server 802 may be stored on the wearable device 804 or another client computer device instead. Similarly, in some embodiments, the server 802 may store program code or perform operations described as being performed by the wearable device 804. For example, the server may perform operations described as being performed by the projection module 822, the display module 823, or the feedback module 824. Furthermore, although some embodiments are described herein with respect to ML models, other prediction models (e.g., a statistical model) may be used instead of or in addition to ML models. For example, a statistical model may be used to replace a neural network model in one or more embodiments. An example ML system 1200 is illustrated and described in more detail with reference to FIG. 12.

In some embodiments, the system 800 may present a set of stimuli (e.g., shapes, text, video, or images) on a display of the wearable device 804. The wearable device 804 may include a case 843, a left transparent display 841, and a right transparent display 842, where light may be projected from emitters of the wearable device through waveguides of the transparent displays 841-842 to present stimuli viewable by an eye(s) of a user wearing the wearable device 804. The wearable device 804 also includes a set of outward-facing sensors 847, where the set of outward-facing sensors 847 may provide sensor data indicating the physical space around the wearable device 804. In some embodiments, the set of outward-facing sensors 847 may include cameras, infrared sensors, lidar sensors, radar sensors, etc. In some embodiments, the sensors 847 can be inward-facing to monitor the user's state (e.g., level of stress, alertness level, etc.).

In some embodiments, the sensors 847 can be cameras that capture images of the environment, people, equipment, user, or the like. The captured images can be used to analyze steps being performed, the environment state, and/or the surrounding environment. This allows the system 800 to provide comprehensive analytics during procedures. For example, output from the sensors 847 of the wearable device 804 can be used to analyze the concentration/focus level of the user, alertness of the user, and stress level of the user (e.g., stress level calculated based on user metrics, such as heart rate, blood pressure, or breathing pattern), and other metrics. In some embodiments, if the user becomes unable to maintain a threshold level of focus, the system 800 can modify the processes described herein such that critical steps are performed by another user, a robotic system, or using alternative techniques.

In some embodiments, sensors 847 can track the wearer's eyes and provide feedback to the user to encourage the user to focus on targeted regions for visualization. This can help train the user to focus attention on regions or areas for actions or monitoring of behavior, activities, or other changing information. The wearable device 804 can receive and store plans, data, and other information sufficient to allow one or more security steps to be performed with or without remote communications. This ensures that security steps can be completed if there is communication failure at the environment.

In some procedures, the system 800 can develop one or more training simulations for a user. The user can perform the simulations for manual procedures, robotically assisted processes, or robotic processes (e.g., moving a camera or audio equipment). The system 800 can adaptively update the simulations based on desired procedure criteria, such as process time, predicted outcome, safety, outcome scores, or the like. This allows the system 800 to develop security plans suitable for the security procedures while training the user. In some embodiments, the wearable device 804 can collect user input to synchronize the user's input with a security procedure. For example, the system 800 can develop security plans with security steps for appropriate time periods based on threshold metrics. If the user becomes fatigued or tired, security steps can be shortened, reduced, or assigned to other users. Other users can use other wearable devices that are synchronized to communicate with the wearable device 804 to provide coordinated operation between users.

In some embodiments, system 800 receives an environment type. A digital environmental model is generated based on the environment type. The digital environmental model includes environmental information associated with a portion of the environmental features. For example, system 800 retrieves modeling parameters for generating the digital environmental model based on one or more security steps. The digital environmental model is generated according to the modeling parameters. The modeling parameters can include, for example, one or more parametric modeling parameters, model properties (e.g., thermal properties), fluid modeling parameters, mesh parameters (e.g., parameters for generating 3D meshes), kinematic parameters, boundary conditions, loading parameters, biomechanical parameters, fluid dynamic parameters, thermodynamic parameters, etc. The environmental features are identified within the digital environmental model. Environmental characteristics are assigned to the identified environmental features for viewing by the at least one user. The environmental characteristics can include, for example, one or more environmental feature statuses (e.g., crowded, sparse, high traffic), area properties, sizes of environmental features, etc.

In some embodiments, system 800 retrieves modeling parameters for generating the environmental model based on one or more security steps. The digital model is generated according to the modeling parameters. The environmental features are identified within the digital model. Environmental characteristics are assigned to the identified environmental features for viewing by the at least one user. For example, the modeling parameters define three-dimensional (3D) objects in an XR or AR environment that can be moved with a number of degrees of freedom (e.g., six degrees of freedom) using a controller (e.g., cursor). Modeling the identified features enables a user to experiment with perspective compared to traditional software.

The XR simulation environment can include polygonal modeling, e.g., connecting points in 3D space (vertices) by line segments to form a polygonal mesh. For example, the XR simulation environment includes textured polygonal meshes that are flexible and/or planar to approximate curved surfaces. In some embodiments, curve modeling (defining surfaces by curves that are influenced by weighted control points) is used. For example, performing security steps virtually on the digital model uses digital sculpting (also known as sculpt modeling or 3D sculpting) to cut, push, pull, smooth, grab, pinch or otherwise manipulate virtual features.

Generating the digital model is performed by developing a mathematical coordinate-based representation of different surfaces of the features in three dimensions by manipulating edges, vertices, and polygons in the simulated XR environment. The digital model represents the physical environment using a collection of points in 3D space, connected by different geometric entities such as lines and curved surfaces, etc. In embodiments, the digital model can be created by procedural modeling or scanning based on imaging methods. The digital model can also be represented as a 2D image using 3D rendering.

The AR mapping to the environment can include solid models that define a volume of the environmental feature they represent, mapped using constructive solid geometry. One or more correlations are determined between the environmental mapping information and at least one security state, e.g., at an oil and gas facility. A confidence-score AR mapping engine is updated based on the determination. The confidence-score AR mapping engine is configured to perform confidence-score AR mapping for other scenarios in new AR environments.

The environmental mapping information can include shells or boundaries that represent surfaces of the environmental features. The AR environment displayed to the at least one user can include polygonal meshes representing the physical features, subdivision surfaces, or level sets for deforming surfaces that can undergo topological changes. The AR mapping process can include transforming digital representations of the features into polygonal representations (polygon-based rendering) of the features overlaid on images of the physical features.

Furthermore, the system 800 may present stimuli on the set of external displays 1505 during a visual testing operation. While the set of external displays 805 is shown with two external displays, a set of external displays may include more or fewer external displays, such as only one external display or more than two external displays. For example, a set of external displays may include four external displays, eight external displays, nine external displays, or some other number of external displays. The external displays may include one or more types of electronic displays, such as computer monitors, smartphones, television screens, laptop devices, tablet devices, LED devices, LCD devices, and other types of electronic displays, etc. In some embodiments, the external display may include a projector, where the location of the external display may include a wall or screen onto which one or more stimuli is projected. In some embodiments, the external display may itself be transparent or partially transparent.

During or after a visual testing operation, the system 800 may obtain feedback information related to the set of stimuli, where the feedback information may indicate whether or how an eye responds to one or more stimuli of the set of stimuli. For example, some embodiments may use the wearable device 804 to collect feedback information that includes various eye-related characteristics. In some embodiments, the feedback information may include an indication of a response of an eye to the presentation of a dynamic stimulus at a first display location 846 on a wearable device 804. Alternatively, or in addition, the feedback information may include an indication of a lack of a response to such a stimulus. The response or lack of response may be determined based on one or more eye-related characteristics, such as an eye movement, a gaze direction, a distance in which an eye's gaze traveled in the gaze direction, a pupil size change, a user-specific input, etc. In some embodiments, the feedback information may include image data or results based on image data. For example, some embodiments may obtain an image or sequence of images (e.g., in the form of a video) of an eye captured during a testing operation as the eye responds to a stimulus.

In some embodiments, the system 800 may track the ocular data of an eye and update associated ocular information based on feedback information indicating eye responses to stimuli. Some embodiments may use a prediction model to detect a non-responsive region of a visual field or another ocular issue of a visual field portion associated with the ocular data. In some embodiments, satisfying a set of vision criteria for a visual field location may include determining whether an eye responded to a stimulus presented at the display location mapped to the visual field location, where different presented stimuli may vary in brightness, color, shape, size, etc.

In some embodiments, the system 800 can adjust viewing by the user based on the ocular information collected by the wearable device 804. Any number of simulations can be performed to generate ocular information suitable for determining optimal settings for a user. The settings can change throughout a security procedure based on security steps. For example, if the user becomes tired or fatigued, the system 800 can adjust the visual field to stimulate the user, thereby increasing attentiveness, e.g., in a war zone or combat scenario. In some embodiments, the user can adjust the stimuli to his or her preferred preferences. Other responses can be collected and associated with the security procedure, specific security steps, or the like. Feedback scores can be generated to rank the collected set of stimuli. The score can be based on the time to complete action, biometric levels of the user (e.g., state of stress or heart rate), or other metrics.

In some embodiments, data used or updated by one or more operations described in this disclosure may be stored in a set of databases 830. In some embodiments, the server 802, the wearable device 804, the set of external displays 805, or other computer devices may access the set of databases to perform one or more operations described in this disclosure. For example, a prediction model used to determine ocular information may be obtained from a first database 831, where the first database 831 may be used to store prediction models or parameters of prediction models. Alternatively, or in addition, the set of databases 830 may store feedback information collected by the wearable device 804 or results determined from the feedback information. For example, a second database 832 may be used to store a set of user profiles that include or link to feedback information corresponding with eye measurement data for the users identified by the set of user profiles. Alternatively, or in addition, the set of databases 830 may store instructions indicating different types of testing procedures. For example, a third database 833 may store a set of testing instructions that causes a first stimulus to be presented on the wearable device 804, then causes a second stimulus to be presented on a first external display 805_a_, and thereafter causes a third stimulus to be presented on a second external display 805_b_.

In some embodiments, the projection module 822 may generate a field-to-display map that maps a position or region of a visual field with a position or region of the set of external displays 805 or of an AR interface displayed on the left transparent display 841 or the right transparent display 842. The field-to-display map may be stored in various forms, such as in the form of a set of multi-dimensional arrays, a function, a subroutine, etc. For example, the field-to-display map may include a first multi-dimensional array, where the first two dimensions of the first array may indicate a coordinate in a combined display space that maps 1:1 with a visual field. In some embodiments, a third dimension of the first array may identify which external display or wearable display to use when presenting a stimulus. Furthermore, a fourth and fifth dimension of the array may be used as coordinates relative to the origin of each respective external display. In some embodiments, an array or other set of numbers described in this disclosure may instead be divided into a plurality of arrays or other subsets of numbers. In some embodiments, the field-to-display map may be used in reverse, such that a display location may be mapped to a visual field location ("field location") using the field-to-display map. Some embodiments pre-generate a display-to-field map by inverting one or more of the arrays described above. Furthermore, some embodiments may use or update a map by using an array or other data structure of the map. Various other embodiments of the field-to-display map are possible, as described elsewhere in this disclosure.

In some embodiments, the projection module 822 may obtain sensor information from the set of outward-facing sensors 847, where the sensor information may include position measurements of the set of external displays 805. For example, a user wearing the wearable device 804 may rotate or translate their head, which may cause a corresponding rotation or translation of the wearable device 804. Some embodiments may detect these changes in the physical orientation or position of the wearable device 804 with respect to the set of external displays 805. Some embodiments may then perform a mapping operation to determine the positions and orientations of the set of external displays based on the sensor information collected by the set of outward-facing sensors 847.

In some embodiments, the projection module 822 may update a field-to-display map that stores or otherwise indicates associations between field locations of a visual field and display locations of the left transparent display 841, the right transparent display 842, or the set of external displays 805. For example, the set of outward-facing sensors 847 may include one or more cameras to collect visual information from a surrounding area of the wearable device 804, where the visual information may be used to determine a position or orientation of one or more devices of the set of external displays 805. As the wearable device 804 is moved, some embodiments may continuously obtain sensor information indicating changes to the external environment, including changes in the position or orientation of the set of external displays 805 relative to the position or orientation of the wearable device 804. For example, some embodiments may generate a point cloud representing the surfaces of objects around the wearable device 804 and determine the positions and orientations of the set of external displays 805 relative to the wearable device 804 based on the point cloud. Furthermore, some embodiments may continuously update the field-to-display map as new sensor information is collected by the set of outward-facing sensors 847.

In some embodiments, the display module 823 may present a set of stimuli on the wearable device 804 or the set of external displays 805. In some embodiments, the left transparent display 841 and right transparent display 842 may be positioned with respect to the case 843 to fit an orbital area on a user such that each display of the transparent displays 841-842 is able to collect data and present stimuli or other images to the user. The left transparent display 841 and right transparent display 842 may contain or be associated with an electronic display configured to present re-created images to an eye viewing the respective transparent display. In various embodiments, electronic display may include a projector, display screen, and/or hardware to present an image viewable by the eye. In some embodiments, a projector of an electronic monitor may be positioned to project images onto an eye of the subject or onto or through a screen, glass, waveguide, or other material. For example, the display module 823 may cause a fixation point or another visual stimulus to be projected onto the first display location 846, where the fixation point at the first display location 846 may then be viewed by an eye of a user wearing the wearable device 804.

In some embodiments, the display module 823 may cause a set of stimuli to be displayed onto electronic displays other than the displays of the other external displays, such as an external display of the set of the external displays 805. For example, after presenting a stimulus on a display of the wearable device 804, the display module 823 may cause a stimulus to be presented on the second external display 805*b* at a second display location 851. As used in this disclosure, an external display location may include a display location on an external display. The display module 823 may then proceed to display additional stimuli on an additional location of the first external display 805*a*, the wearable device 804, or the second external display 805*b*.

Some embodiments may determine the display location for a stimulus by first determining the location or region of a visual field. After determining the location or region of the visual field, some embodiments may then use a field-to-display map to determine which display location of the left transparent display 841, the right transparent display 842, or the set of external displays 805 to use when displaying a stimulus. For example, some embodiments may determine that a previous sequence of sensor measurements indicated that a first region of a visual field has not yet been tested and select this first region for testing. Some embodiments may then use the field-to-display map to determine a third display location 852 on the first external display 805*a* and, in response to selecting the third display location 852, display a stimulus at the third display location 852. As described elsewhere in this disclosure, some embodiments may measure eye movements or otherwise measure responses of an eye to the stimuli presented on the set of external displays 805 to measure a visual field of the eye. Furthermore, as described in this disclosure, a visual field location of a stimulus may include the field location mapped to or otherwise associated with the display location of the stimulus, where the mapping or association between the display and the field location is determined by a field-to-display map. Similarly, as used in this disclosure, a gaze location that is located at a field location may also be described as being located at a display location mapped to the field location.

In some embodiments, the feedback module 824 may record feedback information indicating eye responses to the set of stimuli presented on the wearable device 804 or the set of external displays 805. In some embodiments, the transparent displays 841-842 may include a left inward-directed sensor 844 and a right inward-directed sensor 845, where the inward-directed sensors 844-845 may include eye-tracking sensors. The inward-directed sensors 844-845 may include cameras, infrared cameras, photodetectors, infrared sensors, etc. For example, the inward-directed sensors 844-845 may include cameras configured to track pupil movement and determine and track the visual axes of the subject. In some embodiments, the inward-directed sensors 844-845 may include infrared cameras and be positioned in lower portions relative to the transparent displays 841-842. The inward-directed sensors 844-845 may be directionally aligned to point toward a presumed pupil region for line-of-sight tracking or pupil tracking.

In some embodiments, the feedback module 824 may use the inward-directed sensors 844-845 to collect feedback information indicating eye motion as an eye responds to different stimuli. For example, the feedback module 824 may retrieve feedback information of an eye collected by the inward-directed sensors 844-845 as the eye responds to the presentation of a stimulus at the first display location 1546 and the second display location 851. By collecting feedback information while stimuli are presented on both the wearable device 804 and one or more devices of the set of external displays 805, some embodiments may increase the boundaries of a visual field for which ocular data may be detected.

In some embodiments, the statistical predictor 825 may retrieve stimuli information, such as stimuli locations and characteristics of the stimuli locations, where the stimuli locations may include locations on the set of external displays 805. The statistical predictor 825 may also retrieve training outputs indicative of the presence or absence of ocular responses or other outputs of a prediction model. The statistical predictor 825 may then provide the set of stimuli information and training outputs to a ML model to update the parameters of the ML model to predict ocular responses based on new inputs. An example ML system 1200 is illustrated and described in more detail with reference to FIG. 12. Alternatively, or in addition, the statistical predictor 825 may use statistical models or rules to determine ocular responses and generate a visual field map representing a visual field of an eye, where one or more regions of the visual field map may be associated with a set of ocular responses or otherwise include ocular response information.

Figure 9:
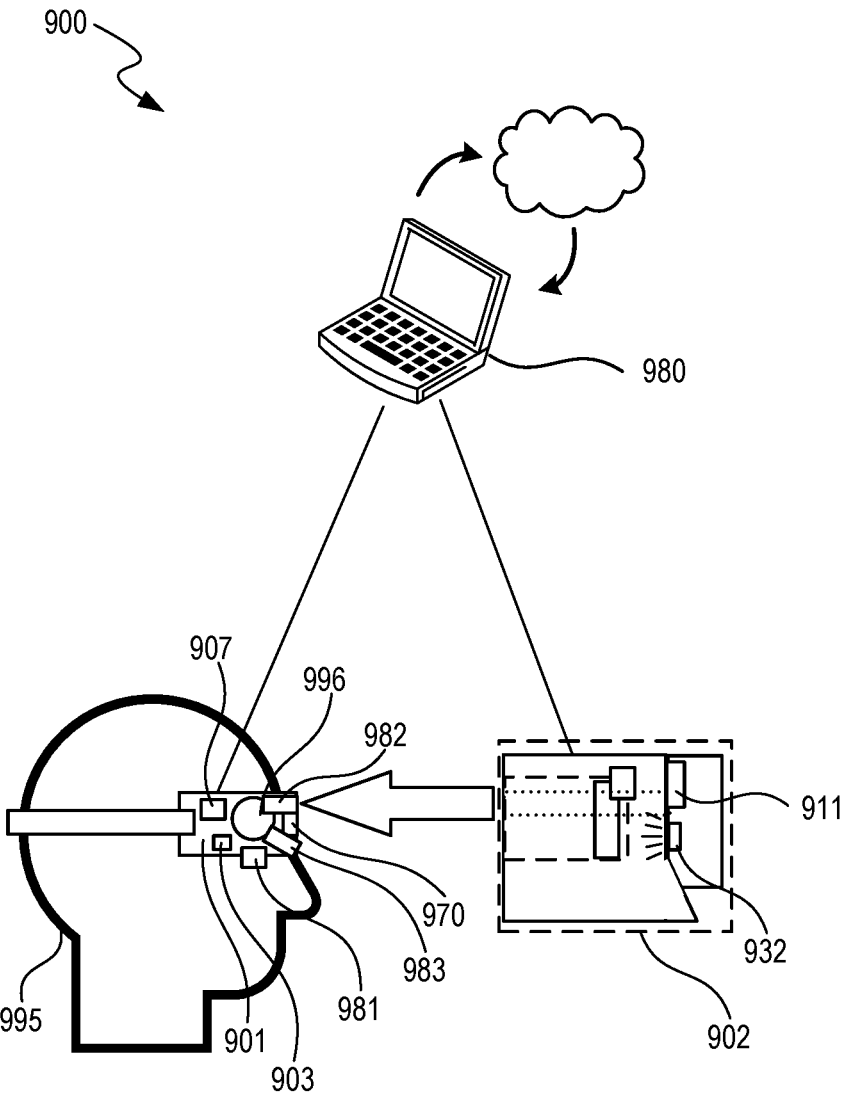
FIG. 9 illustrates an XR head mounted display (HMD), in accordance with one or more embodiments.

FIG. 9 illustrates an XR HMD 901, in accordance with one or more embodiments. HMD 901 can be, for example, an augmented reality device worn by a user while the user views a particular environment. Information can be displayed at selected locations to avoid obstructing the viewing of targeted areas. A user 995 (e.g., video gamer or security professional) can wear HMD 901, which can include a computing device 907. Computing device 907 can include a processor, microprocessor, controller, or other circuitry. In some embodiments, an eye 996 of the user may be capable of viewing images and video in XR from the operating room 902 through lenses 970 of the HMD 901. The HMD 901 may include an interior-facing camera to capture eye-related information and a set of exterior-facing cameras that include an exterior-facing camera 982.

In some embodiments, a user initiates an XR session using computing system 980 that is in communication with the HMD 901. Computing system 980 may include a standalone computer capable of operating without connecting to another computing device outside of a local network. Alternatively, or in addition, the computing system 980 may include a computing system that receives program instructions or required data from an external data source not available through a local network.

In some embodiments, the computing system 980 may initiate an XR session. Computing system 980 may communicate with the HMD 901 via a wireless connection or wired connection. For example, the computing system 980 may send a wireless message to the computing device 907 to initiate an XR session. For example, the computing system 980 may send a command to the HMD 901 via a Bluetooth® connection, where the command may cause the HMD 901 to activate.

In some embodiments, the computing system 980 may communicate with the HMD 901 to perform one or more operations. For example, the HMD 901 may present an initial set of instructions to user 995 and request a response from user 995. After user 995 provides a requested response (e.g., pressing a button, making a statement, etc.), the computing system 980 may send a first set of instructions to the HMD 901 to calibrate readings to more accurately measure eye-related data associated with the eye 996. After the HMD 901 sends a message to the computing system 980 that calibration operations have been completed, the computing system 980 may send further instructions to the HMD 901. The computing system 980 may determine the position of a fixation point based on eye-related readings and send a message to the HMD 901 that causes the HMD 901 to display a visual stimulus at the fixation point on the lenses 970. After receiving a message from the HMD 901 that the eye 996 has set its gaze at the fixation point, the computing system 980 may continue the XR session.

In some embodiments, an application executed by the computing device 907 of the HMD 901 may be used to control operations of components of the HMD 901 or other electronic components. For example, the application executed by computing device 907 may begin a visual test program and send a wireless message to a circuitry of the system 980 using a wireless headset communication subsystem 903. The wireless message may be based on one of various types of communication standards, such as a Bluetooth® standard, a Wi-Fi Direct standard, a NFC standard, a ZigBee® standard, a 6LoWPAN standard, etc.

In some embodiments, an application being executed by the computing device 907 may retrieve data from the interior-facing camera 983 and send instructions to control equipment based on this data. For example, the computing device 907 may execute an application to perform a Viola-Jones object detection framework to detect an eye in a set of images using a boosted feature classifier based on video data provided by the interior-facing camera 983. Furthermore, the application executed by the computing device 907 may permit additional sensor data to trigger equipment in a room 902, such as by receiving voice instructions captured from a microphone 981, motion detected by the exterior-facing camera 982, feeling a set of touches on the housing of the HMD 901, etc.

In some embodiments, a testing application executed by the computing device 907 detects that a gaze location of user 995 is focused on a target user interface (UI) element or a target direction based on data collected by interior-facing camera 983. For example, HMD 901 displays a set of instructions that causes user 995 to look at a target UI location. In some embodiments, the target UI location is represented by a target region associated with the target UI location, such that a gaze location determined to be within the target region is considered to be focused on the target UI location. In response to a determination that the gaze location of eye 996 is focused on the target UI location based on images provided by the interior-facing camera 983, the application can activate equipment 932. Furthermore, the application can send a message to a robotic system 911 to turn off equipment 932 based on a determination that the target UI location is no longer a focus of the user's gaze. Alternatively, some embodiments may forego waiting for user 995 to focus on a particular UI location or a particular direction before activating the equipment 932.

In additional embodiments, a computer system obtains environmental data, e.g., from camera 110 of FIG. 1A. A user-mapping program is used to train an intra-operative AR mapping platform based on the obtained data (audio, images, video, etc.). For example, the user-mapping program is configured to receive user input for the identification of environmental features/objects. One or more environmental features are identified based on the obtained data. The computer system performs an intra-operative AR mapping of the identified one or more features using the trained intra-operative AR mapping platform. Via an AR device, the intra-operative AR mapping is displayed to be viewed by a user.

In some embodiments, performing the intra-operative AR mapping includes determining one or more features to be identified. The one or more features are identified. The one or more features and associated information are labeled. For example, one or more unidentifiable features are marked. In some embodiments, an autonomous mapping platform is used to perform the intra-operative AR mapping. The autonomous mapping platform is trained by multiple users inputting data for reference images and validated for autonomously mapping a set of features associated with an environment.

In some embodiments, a computer system selects one or more candidate features of a virtual environmental model in a VR environment displayed to a user. For example, the candidate features can be edges, points, or object parts. User input is received for the selected one or more candidate features. The computer system determines whether the user input for one or more candidate features reaches a threshold confidence score. In response to the user input reaching the threshold confidence score, the user input is identified as accurately labeling the one or more candidate features. In some embodiments, a computer system stores the user input as reference label data for the corresponding one or more candidate features. For example, the user input includes a label for each one of the respective one or more candidate features.

In some embodiments, determining whether the user input for one or more candidate features reaches the threshold confidence score is based on a comparison reference user input for similar candidate features. For example, the user input is used to train a ML model. For each of the candidate features, the user input can include at least one of a name of the candidate feature or user annotation.

Figure 10:
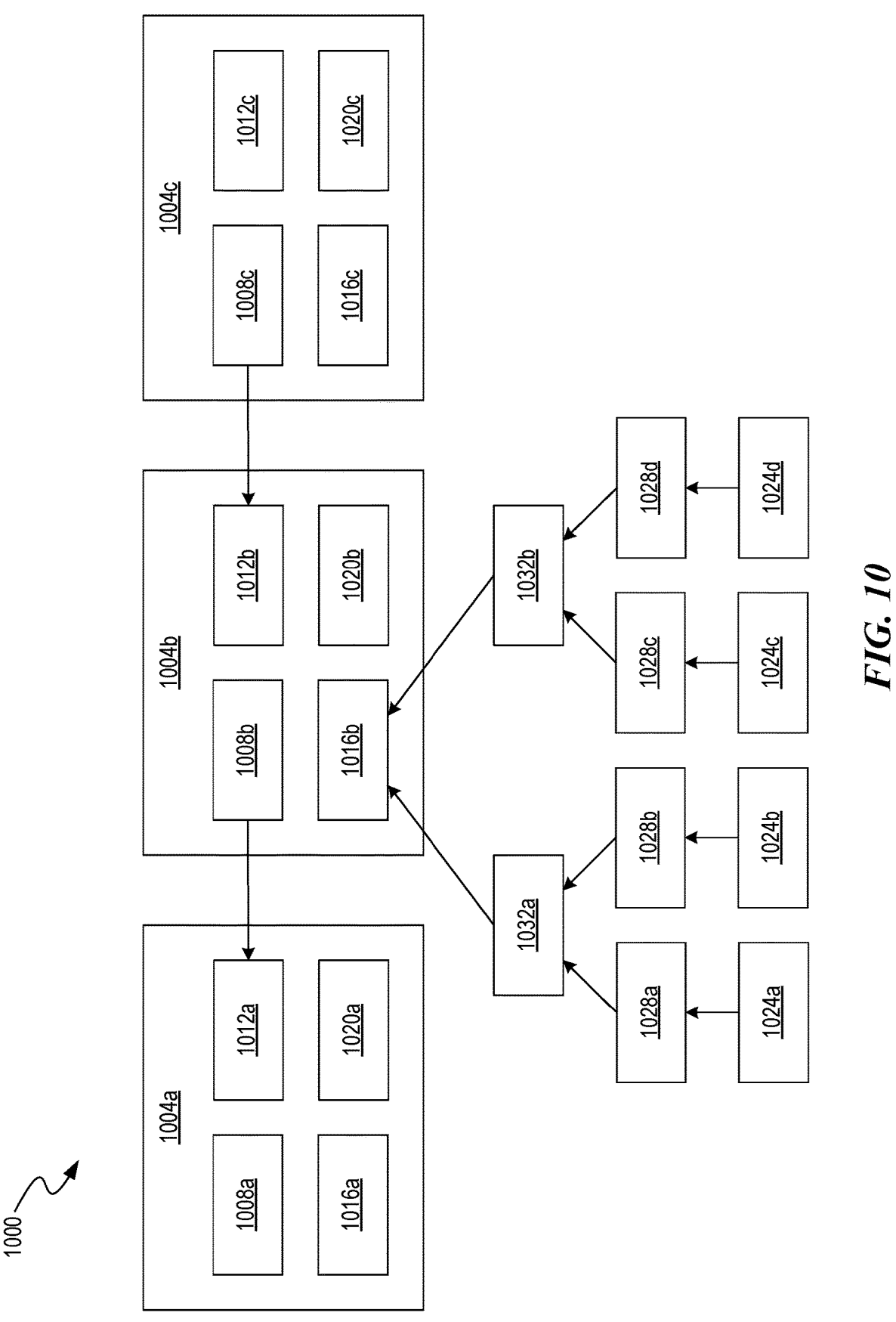
FIG. 10 is a block diagram illustrating components of at least a portion of an exemplary blockchain system, in accordance with one or more embodiments of this disclosure.

FIG. 10 is a block diagram illustrating components of at least a portion of an example blockchain system 1000, in accordance with one or more embodiments of this disclosure. Blockchain system 1000 includes blockchain 1004. In embodiments, the blockchain 1004 is a distributed ledger of transactions (e.g., a continuously growing list of records, such as records of transactions for digital assets such as cryptocurrency, bitcoin, or electronic cash) that is maintained by a blockchain system 1000. For example, the blockchain 1004 is stored redundantly at multiple nodes (e.g., computers) of a blockchain network. Each node in the blockchain network can store a complete replica of the entirety of blockchain 1004. In some embodiments, the blockchain system 1000 implements storage of an identical blockchain at each node, even when nodes receive transactions in different orderings. The blockchain 1004 shown by FIG. 10 includes blocks such as block 1004a, block 1004b, and/or block 1004c. Likewise, embodiments of the blockchain system 1000 can include different and/or additional components or be connected in different ways.

The terms "blockchain" and "chain" are used interchangeably herein. In embodiments, the blockchain 1004 is a distributed database that is shared among the nodes of a computer network. As a database, the blockchain 1004 stores information electronically in a digital format. The blockchain 1004 can maintain a secure and decentralized record of transactions (e.g., transactions such as transaction 1024a and/or transaction 1024b). For example, the ERC-721 or ERC-1155 standards are used for maintaining a secure and decentralized record of transactions. The blockchain 1004 provides fidelity and security for the data record. In embodiments, blockchain 1004 collects information together in groups, known as "blocks" (e.g., blocks such as block 1004a, block 1004b, and/or block 1004c) that hold sets of information.

The blockchain 1004 structures its data into chunks (blocks) (e.g., blocks such as block 1004a, block 1004b, and/or block 1004c) that are strung together. Blocks (e.g., block 1004c) have certain storage capacities and, when filled, are closed and linked to a previously filled block (e.g., block 1004b), forming a chain of data known as the "blockchain." New information that follows a freshly added block (e.g., block 1004*b*) is compiled into a newly formed block (e.g., block 1004*c*) that will then also be added to the blockchain 1004 once filled. The data structure inherently makes an irreversible timeline of data when implemented in a decentralized nature. When a block is filled, it becomes a part of this timeline of blocks. Each block (e.g., block 1004*a*) in the blockchain system 1000 is given an exact timestamp (e.g., timestamp 1012*a*) when it is added to the blockchain system 1000. In the example of FIG. 10, blockchain system 1000 includes multiple blocks. Each of the blocks (e.g., block 1004*a*, block 1004*b*, block 1004*c*) can represent one or multiple transactions and can include a cryptographic hash of the previous block (e.g., previous hashes 1008*a-c*), a timestamp (e.g., timestamps 1012*a-c*), a transactions root hash (e.g., 1016*a-c*), and a nonce (e.g., 1020*a-c*). A transactions root hash (e.g., transactions root hash 1016*b*) indicates the proof that the block 1004*b* contains all the transactions in the proper order. Transactions root hash 1016*b* proves the integrity of transactions in the block 1004*b* without presenting all transactions.

In embodiments, the timestamp 1012*a-c* of each of corresponding blocks of block 1004*a*, block 1004*b*, block 1004*c* includes data indicating a time associated with the block. In some examples, the timestamp includes a sequence of characters that uniquely identifies a given point in time. In one example, the timestamp of a block includes the previous timestamp in its hash and enables the sequence of block generation to be verified.

In embodiments, nonces 1020*a-c* of each of corresponding blocks of block 1004*a*, block 1004*b*, block 1004*c* include any generated random or semi-random number. The nonce can be used by miners during proof of work (PoW), which refers to a form of adding new blocks of transactions to blockchain 1004. The work refers to generating a hash that matches the target hash for the current block. For example, a nonce is an arbitrary number that miners (e.g., devices that validate blocks) can change in order to modify a header hash and produce a hash that is less than or equal to the target hash value set by the network.

As described above, each of blocks of block 1004*a*, block 1004*b*, block 1004*c* of blockchain 1004 can include respective block hash, e.g., transactions root hash 1016*a*, transactions root hash 1016*b*, and transactions root hash 1016*c*. Each of block hashes 1016*a-c* can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 10, block 1004*b* records transactions 1024*a-d*. Each of the leaf nodes 1028*a-d* contain a hash corresponding to transactions 1024*a-d* respectively. As described above, a hash (e.g., the hash in leaf node such as node 1028*a*) can be a hash of components of a transaction (e.g., transaction 1024*a*), for example, a reference that identifies an output of a prior transaction that is input to the transaction 1024*a*, an attachment, and a command. Each of the non-leaf nodes of node 1032*a* and node 1032*b* can contain a hash of the hashes of its child nodes (e.g., leaf nodes such as node 1028*a* and node 1028*b*). In this example, node 1032*a* can contain a hash of the hashes contained in node 1028*a*, node 1028*b* and node 1032*b* can contain a hash of the hashes contained in node 1028*c*, node 1028*d*. The root node, which includes (e.g., contains) transactions root hash 1016*b*, can contain a hash of the hashes of child nodes 1032*a-b*.

A Merkle tree representation of a transaction (e.g., transaction 1024*a*) allows an entity needing access to the transaction 1024*a* to be provided with only a portion that includes the components that the entity needs. For example, if an entity needs only the transaction summary, the entity can be provided with the nodes (and each node's sibling nodes) along the path from the root node to the node of the hash of the transaction summary. The entity can confirm that the transaction summary is that used in the transaction 1024*a* by generating a hash of the transaction summary and calculating the hashes of the nodes along the path to the root node. If the calculated hash of the root node matches the hash of node 1028*a* of the transaction 1024*a*, the transaction summary is confirmed as the one used in the transaction. Because only the portion of the Merkle tree relating to components that an entity needs is provided, the entity will not have access to other components. Thus, the confidentiality of the other components is not compromised.

To transfer ownership of a digital asset, such as a bitcoin, using the blockchain system 1000, a new transaction, such as one of transactions 1024*a-d*, is generated and added to a stack of transactions in a block, e.g., block 1004*b*. To record a transaction in a blockchain, each party and asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (i.e., the current owner) creates a transaction (e.g., transaction 1024*a*) against the account for the asset that indicates that the transaction 1024*a* is a transfer of ownership and outputs a token identifying the second user as the next owner and a token identifying the asset. The transaction 1024*a* is signed by the private key of the first user (i.e., the current owner), and the transaction 1024*a* is evidence that the second user is now the new current owner and that ownership has been transferred from the first to the second user.

The transaction 1024*a* (e.g., a new transaction), which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the transaction 1024*a* (e.g., the new transaction). Once the block is full, the block is "capped" with a block header, that is, a hash digest of all the transaction identifiers within the block. The block header is recorded as the first transaction in the next block in the chain, creating a mathematical hierarchy called the "blockchain." To verify the current owner, the blockchain 1004 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, in some embodiments, the blockchain system 1000 uses one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 1024*a-d*) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 1024*a* in the blockchain 1004 using a token that is a hash of node 1028*a* of the computer code so that the computer code that is executed can be authenticated. When deployed, a constructor of the smart contract executes, initializing the smart contract and its state. The state of a smart contract is stored persistently in the blockchain 1004. When a transaction 1024*a* is recorded against a smart contract, a message is sent to the smart contract, and the computer code of the smart contract executes to implement the transaction (e.g., debit a certain amount from the balance of an account). The computer code ensures that all the terms of the contract are complied with before the transaction 1024*a* is recorded in the blockchain 1004.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., transaction 1024*a*) that transfers the ownership of the asset to the buyer and a transaction (e.g., transaction 1024*b*) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either of transaction 1024*a* or transaction 1024*b* is not successful, neither transaction is recorded.

When a message is sent to a smart contract to record a transaction 1024*a*, the message is sent to each node that maintains a replica of the blockchain 1004. Each node executes the computer code of the smart contract to implement the transaction 1024*a*. For example, if a hundred nodes each maintain a replica of the blockchain 1004, the computer code executes at each of the hundred nodes. When a node completes execution of the computer code, the result of the transaction 1024*a* is recorded in the blockchain 1004. The nodes employ a consensus algorithm to decide which transactions (e.g., transaction 1024*c*) to keep and which transactions (e.g., transaction 1024*d*) to discard. Although the execution of the computer code at each node helps ensure the authenticity of the blockchain 1004, large amounts of computer resources are required to support such redundant execution of computer code.

Although blockchains can effectively store transactions 1024*a-d*, the large amount of computer resources, such as storage and computational power, needed to maintain all the replicas of the blockchain can be problematic. To overcome this problem, some systems for storing transactions 1024*a-d* do not use blockchains, but rather have each party to a transaction maintain its own copy of the transaction 1024*a*. One such system is the Corda™ system developed by R3™ that provides a decentralized distributed ledger platform in which each participant in the platform has a node (e.g., computer system) that maintains its portion of the distributed ledger.

When parties agree on the terms of a transaction 1024*a*, a party submits the transaction 1024*a* to a notary, which is a trusted node, for notarization. The notary maintains a consumed output database of transaction outputs that have been input into other transactions. When a transaction 1024*a* is received, the notary checks the inputs to the transaction 1024*a* against the consumed output database to ensure that the outputs that the inputs reference have not been spent. If the inputs have not been spent, the notary updates the consumed output database to indicate that the referenced outputs have been spent, notarizes the transaction 1024*a* (e.g., by signing the transaction or a transaction identifier with a private key of the notary), and sends the notarized transaction to the party that submitted the transaction 1024*a* for notarization. When the party receives the notarized transaction, the party stores the notarized transaction and provides the notarized transaction to the counterparties.

In embodiments, a notary is a non-validating notary or a validating notary. When a non-validating notary is to notarize a transaction (e.g., transaction 1024*b*), the non-validating notary determines that the prior output of a prior transaction (e.g., transaction 1024*a*), that is, the input of a current transaction, e.g., transaction 1024*b*, has not been consumed. If the prior output has not been consumed, the non-validating notary notarizes the transaction 1024*b* by signing a hash of node 1028*b* of the transaction. To notarize a transaction 1024*b*, a non-validating notary needs only the identification of the prior output (e.g., the hash of node 1028*a* of the prior transaction (e.g., transaction 1024*a*) and the index of the output) and the portion of the Merkle tree needed to calculate the hash of node 1028*b* of the transaction 1024*b*.

As described herein, in some embodiments, the blockchain system 1000 uses one or more smart contracts to enable more complex transactions. For example, a validating notary validates a transaction (e.g., transaction 1024*d*), which includes verifying that prior transactions 1024*a-c* in a backchain of transactions are valid. The backchain refers to the collection of prior transactions (e.g., transaction 1024*c*) of a transaction 1024*d*, as well as prior transactions of transaction 1024*a*, transaction 1024*b*, and transaction 1024*c*, and so on. To validate a transaction 1024*d*, a validating notary invokes validation code of the transaction 1024*d*. In one example, a validating notary invokes validation code of a smart contract of the transaction 1024*d*. The validation code performs whatever checks are needed to comply with the terms applicable to the transaction 1024*d*. This checking can include retrieving the public key of the owner from the prior transaction (e.g., transaction 1024*c*) (pointed to by the input state of the transaction 1024*d*) and checks the signature of the transaction 1024*d*, ensuring that the prior output of a prior transaction that is input has not been consumed, and checking the validity of each transaction (e.g., transaction 1024*c*) in the backchain of the transactions. If the validation code indicates that the transaction 1024*d* is valid, the validating notary notarizes the transaction 1024*d* and records the output of the prior transaction (e.g., transaction 1024*c*) as consumed.

In some examples, to verify that the transactions 1024*a-d* in a ledger stored at a node are correct, the blocks, e.g., block 1004*a*, block 1004*b*, block 1004*c* in the blockchain 1004 can be accessed from oldest block (e.g., block 1004*a*) to newest block (e.g., block 1004*c*), generating a new hash of the block 1004*c* and comparing the new hash to the hash 1008*c* generated when the block 1004*c* was created. If the hashes are the same, then the transactions in the block are verified. In one example, the Bitcoin system also implements techniques to ensure that it would be infeasible to change a transaction 1024*a* and regenerate the blockchain 1004 by employing a computationally expensive technique to generate a nonce 1020*b* that is added to the block when it is created. A bitcoin ledger is sometimes referred to as an Unspent Transaction Output ("UTXO") set because it tracks the output of all transactions that have not yet been spent.

In some embodiments, a self-sovereign identity (SSI) approach to digital identity is used that gives individuals control over the information they use to prove who they are to websites, services, and applications across the web. In an SSI system, the user accesses services in a streamlined and secure manner, while maintaining control over the information associated with their identity. SSI addresses the difficulty of establishing trust in an interaction. In order to be trusted, one party in an interaction will present credentials to the other parties, and those relying on parties can verify that the credentials came from an issuer that they trust. In this way, the verifier's trust in the issuer is transferred to the credential holder. This basic structure of SSI with three participants is sometimes called "the trust triangle". For an identity system to be self-sovereign, users control the verifiable credentials that they hold and their consent is required to use those credentials. This reduces the unintended sharing of users' personal data.

In an SSI system, holders generate and control unique identifiers called decentralized identifiers. Most SSI systems are decentralized, where the credentials are managed using crypto wallets and verified using public-key cryptography anchored on a distributed ledger. The credentials may contain data from an issuer's database, a social media account, a history of transactions on an e-commerce site, or attestation from friends or colleagues.

Figure 11A:
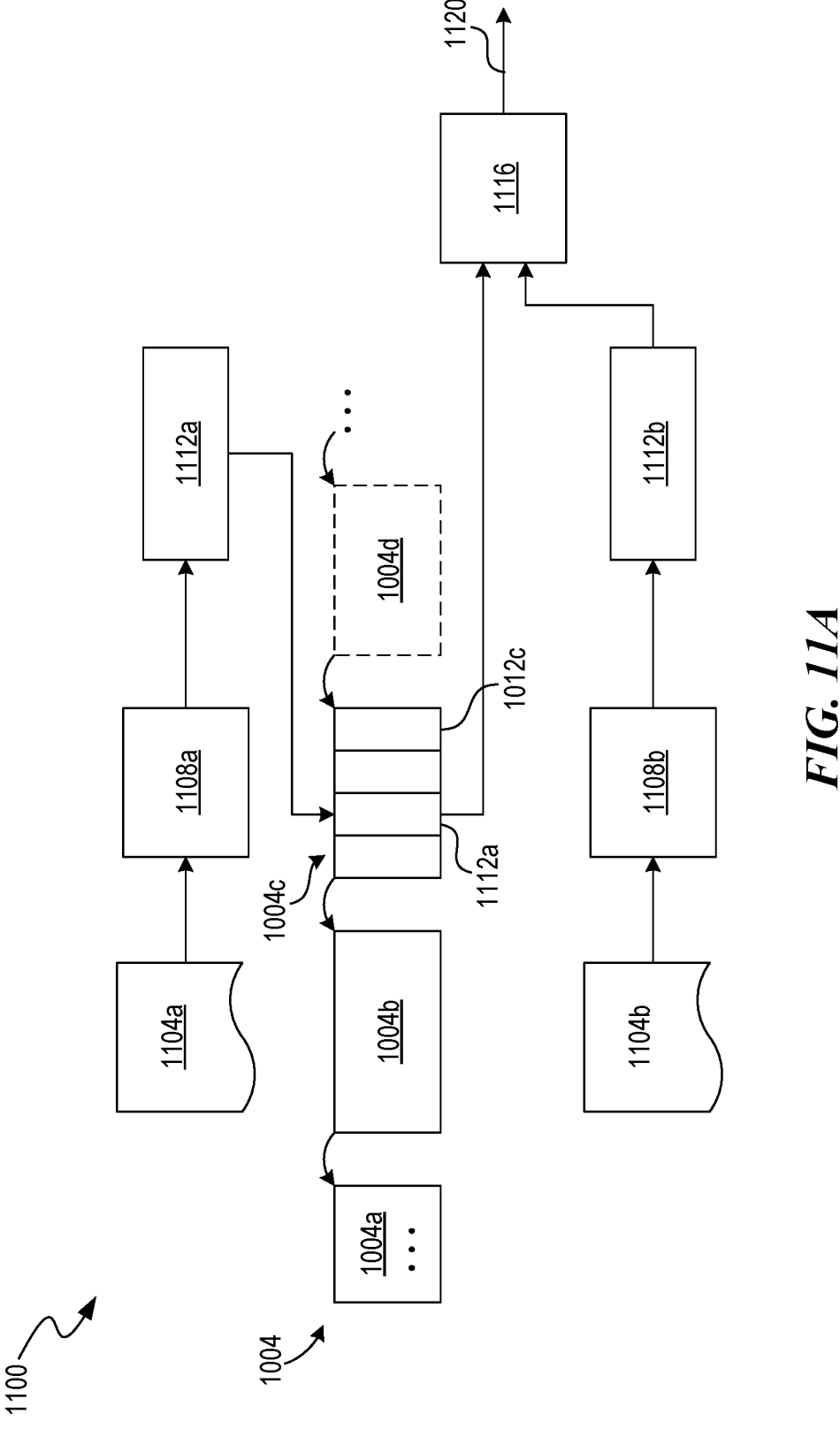
FIG. 11A is a drawing illustrating an application of a hash function, in accordance with one or more embodiments of this disclosure.

FIG. 11A is a drawing illustrating an example hash algorithm. The process 1100 shown by FIG. 11A uses a hash algorithm to generate a token or perform a cryptographic transaction on a blockchain. An example blockchain 1004, e.g., as shown in FIG. 11A, is also illustrated and described in detail with reference to FIG. 10. The process 1100 can be performed by a computer system such as that described with reference to FIG. 13 and/or by nodes of the blockchain 1004. Some embodiments include different and/or additional steps or perform steps in different orders.

In embodiments, a digital message, electronic art, a digital collectible, any other form of digital content, or a combination thereof (e.g., digital content 1104*a*) can be hashed using hashing algorithm 1108*a*. The hashing algorithm 1108*a* (sometimes referred to as a "hash function") can be a function used to map data of arbitrary size (e.g., digital content 1104*a*) to fixed-size values (e.g., hash of values 1112*a*). The values 1112*a* that are returned by the hashing algorithm 1108*a* can be called hash values, hash codes, digests, or hashes. The values 1112*a* can be used to index a fixed-size table called a hash table. A hash table, also known as a hash map, is a data structure that implements an associative array or dictionary, which is an abstract data type that maps keys (e.g., digital content 1104*a*) to values 1112*a*.

The output of the hashed digital content (e.g., hash of values 1112*a*) can be inserted into a block (e.g., block 1004*c*) of the blockchain 1004 (e.g., comprising blocks such as blocks such as block 1004*a*, block 1004*b*, block 1004*c*-). The block 1004*c* can include, among other things, information such as timestamp 1012*c*. In order to verify that the block 1004*c* is correct, a new hash 1112*b* is generated by applying hashing algorithm 1108*b* to the digital content 1104*b*. The new hash 1112*b* is compared to the hash of values 1112*a* in the blockchain 1004 at comparison step 1116. If the new hash 1112*b* is the same as the hash of values 1112*a* of the block 1004*c*, the comparison yields an indication that they match. For example, the decision 1120 can indicate that the hashes of values 1112*a-b* are the same or not. The hashes can be indicated to be the same if the characters of the hash match. The hashing algorithms 1108*a-b* can include any suitable hashing algorithm. Examples include Message Digest 5 (MD5), Secure Hashing Algorithm (SHA) and/or the likes.

Components of the process 1100 can generate or validate an NFT, which is a cryptographic asset that has a unique identification code and metadata that uniquely identifies the NFT. In one example, the digital content 1104*a* can be hashed and minted to generate an NFT, or the digital content 1104*a* can represent an NFT that is verified using the process 1100 and the digital content 1104*b*. An NFT can include digital data stored in the blockchain 1004. The ownership of an NFT is recorded in the blockchain 1004 and transferrable by an owner, allowing the NFT to be sold and traded. The NFT contains a reference to digital files such as photos, videos, or audio (e.g., digital content 1104*a*). Because NFTs are uniquely identifiable assets, they differ from cryptocurrencies, which are fungible. In particular, NFTs function like cryptographic tokens, but unlike cryptocurrencies such as Bitcoin™ or Ethereum™, NFTs are not mutually interchangeable, and so are not fungible.

The NFT can be associated with a particular digital or physical asset such as images, art, music, and sport highlights and can confer licensing rights to use the asset for a specified purpose. As with other assets, NFTs are recorded on a blockchain when a blockchain 1004 concatenates records containing cryptographic hashes—sets of characters that identify a set of data—onto previous records, creating a chain of identifiable data blocks such as block 1004*a*, block 1004*b*, block 1004*c*, and block 1004*d*. A cryptographic transaction process enables authentication of each digital file by providing a digital signature that tracks NFT ownership. In embodiments, a data link that is part of the NFT records points to details about where the associated art is stored.

Minting an NFT can refer to the process of turning a digital file (e.g., digital content 1104*a*) into a crypto collectible or digital asset on blockchain 1004 (e.g., the Ethereum™ blockchain). The digital item or file (e.g., digital content 1104*a*) can be stored in the blockchain 1004 and cannot be able to be edited, modified, or deleted. The process of uploading a specific item onto the blockchain 1004 is known as "minting." For example, "NFT minting" can refer to a process by which a digital art or digital content 1104*a* becomes a part of the Ethereum™ blockchain. Thus, the process turns digital content 1104*a* into a crypto asset, which is easily traded or bought with cryptocurrencies on a digital marketplace without an intermediary.

Figure 11B:
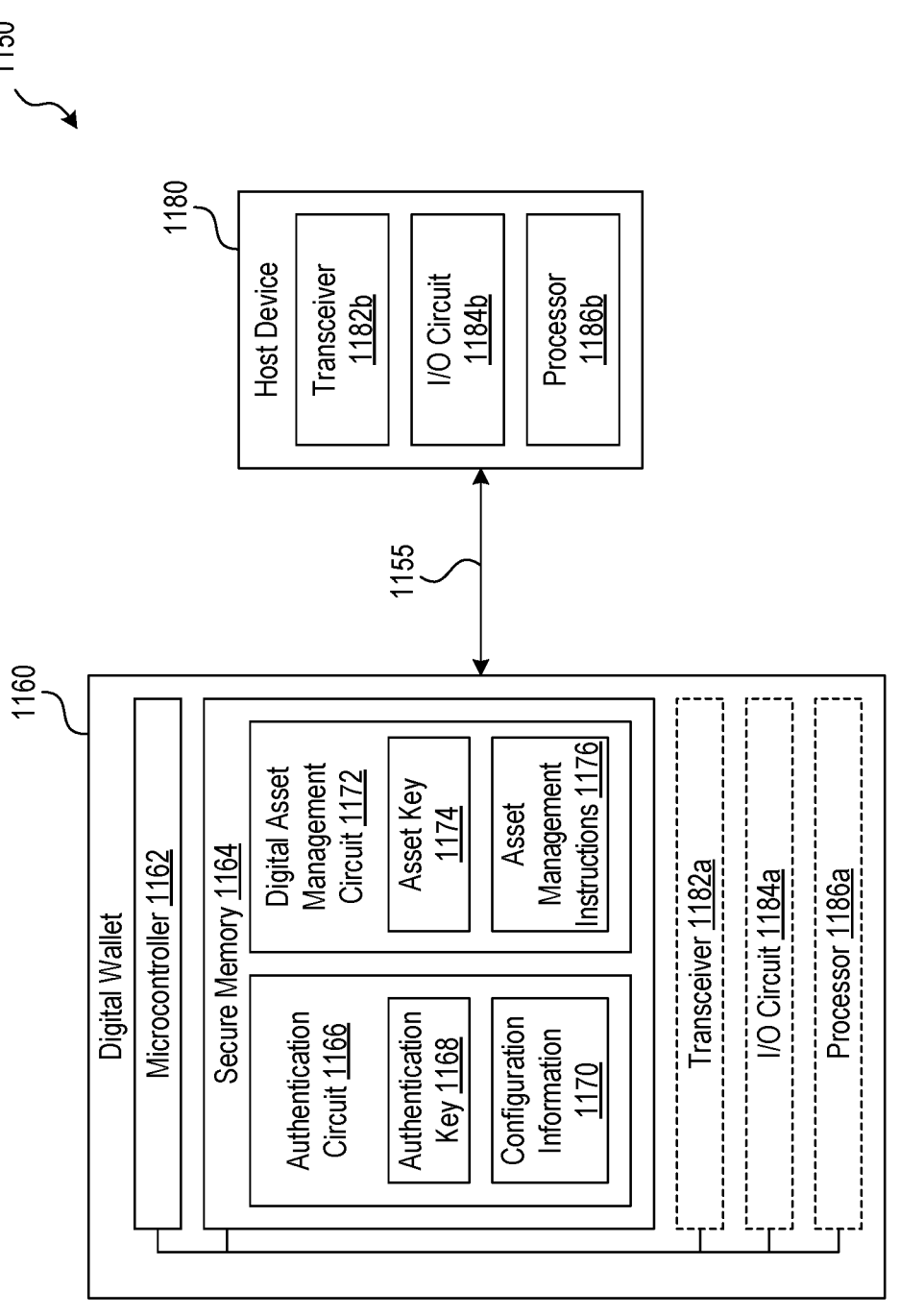
FIG. 11B is a block diagram illustrating an example cryptographic wallet, in accordance with one or more embodiments of this disclosure.

FIG. 11B is a block diagram 1150 illustrating an example cryptographic wallet 1160. As a general overview, cryptographic wallet 1160 is an electronic entity that allows users to securely manage digital assets. According to various embodiments, the cryptographic wallet 1160 can be a hardware-based wallet (e.g., can include dedicated hardware component(s)), a software-based wallet, or a combination thereof. Example digital assets that can be stored and managed using the cryptographic wallet 1160 include digital coins, digital tokens, and/or the like. In some embodiments, tokens are stored on a blockchain system, such as the blockchain system 1000 described in FIG. 10. In some embodiments, the cryptographic wallet 1160 may be capable of connecting to and managing assets that are native to or associated with multiple, different blockchain systems (e.g., including multiple blockchain systems having structure similar to or equivalent to blockchain system 1000).

As defined herein, the terms "coin" and "token" refer to a digital representation of a particular asset, utility, ownership interest, and/or access right. Any suitable type of coin or token can be managed using various embodiments of the cryptographic wallet 1160. In some embodiments, tokens include cryptocurrency, such as exchange tokens and/or stablecoins. Exchange tokens and/or stablecoins can be native to a particular blockchain system and, in some instances, can be backed by a value-stable asset, such as fiat currency, precious metal, oil, or another commodity. In some embodiments, tokens are utility tokens that provide access to a product or service rendered by an operator of the blockchain system 1000 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership. In some embodiments, tokens are decentralized finance (DeFi) tokens. DeFi tokens can be used to access feature sets of DeFi software applications (dApps) built on the blockchain system 1000. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system) or off-chain (e.g., implemented as computer software on computing devices that are separate from the blockchain system 1000).

As shown, the cryptographic wallet 1160 of FIG. 11B is communicatively coupled to the host device 1180 (e.g., a mobile phone, a laptop, a tablet, a desktop computer, a wearable device, a point-of-sale (POS) terminal, an automated teller machine (ATM) and the like) via the communications link 1155. In some embodiments, the host device 1180 can extend the feature set available to the user of the cryptographic wallet 1160 when it is coupled to the host device 1180. For instance, the host device may provide the user with the ability to perform balance inquiries, convert tokens, access exchanges and/or marketplaces, perform transactions, access computing systems, and/or the like.

In some embodiments, the cryptographic wallet 1160 and the host device 1180 can be owned and/or operated by the same entity, user, or a group of users. For example, an individual owner of the cryptographic wallet 1160 may also operate a personal computing device that acts as a host device 1180 and provides enhanced user experience relative to the cryptographic wallet 1160 (e.g., by providing a user interface that includes graphical features, immersive reality experience, virtual reality experience, or similar). In some embodiments, the cryptographic wallet 1160 and the host device 1180 can be owned and/or operated by different entities, users and/or groups of users. For example, the host device 1180 can be a point-of-sale (POS) terminal at a merchant location, and the individual owner of the cryptographic wallet 1160 may use the cryptographic wallet 1160 as a method of payment for goods or services at the merchant location by communicatively coupling the two devices for a short period of time (e.g., via chip, via near-field communications (NFC), by scanning of a bar code, by causing the cryptographic wallet 1160 to generate and display a quick response (QR) code, and/or the like) to transmit payment information from the cryptographic wallet 1160 to the host device 1180.

The cryptographic wallet 1160 and the host device 1180 can be physically separate and/or capable of being removably coupled. The ability to physically and communicatively uncouple the cryptographic wallet 1160 from the host device 1180 and other devices enables the air-gapped cryptographic wallet (e.g., cryptographic wallet 1160) to act as "cold" storage, where the stored digital assets are moved offline and become inaccessible to the host device 1180 and other devices. Further, the ability to physically and communicatively uncouple the cryptographic wallet 1160 from the host device 1180 allows the cryptographic wallet 1160 to be implemented as a larger block of physical memory, which extends the storage capacity of the cryptographic wallet 1160, similar to a safety deposit box or vault at a brick-and-mortar facility.

Accordingly, in some embodiments, the cryptographic wallet 1160 and the host device 1180 are physically separate entities. In such embodiments, the communications link 1155 can include a computer network. For instance, the cryptographic wallet 1160 and the host device 1180 can be paired wirelessly via a short-range communications protocol (e.g., Bluetooth, ZigBee, infrared communication) or via another suitable network infrastructure. In some embodiments, the cryptographic wallet 1160 and the host device 1180 are removably coupled. For instance, the host device 1180 can include a physical port, outlet, opening, or similar to receive and communicatively couple to the cryptographic wallet 1160, directly or via a connector.

In some embodiments, the cryptographic wallet 1160 includes tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the cryptographic wallet 1160 can include an integrated circuit, such as a SIM card, a smart cart, and/or the like. For instance, in some embodiments, the cryptographic wallet 1160 can be a physical smart card that includes an integrated circuit, such as a chip that can store data. In some embodiments, the cryptographic wallet 1160 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the cryptographic wallet 1160 and the host device 1180 are non-removably coupled. For instance, various components of the cryptographic wallet 1160 can be co-located with components of the host device 1180 in the housing of the host device 1180. In such embodiments, the host device 1180 can be a mobile device, such as a phone, a wearable, or similar, and the cryptographic wallet 1160 can be built into the host device. The integration between the cryptographic wallet 1160 and the host device 1180 can enable improved user experience and extend the feature set of the cryptographic wallet 1160 while preserving computing resources (e.g., by sharing the computing resources, such as transceiver, processor, and/or display or the host device 1180). The integration further enables the ease of asset transfer between parties. The integration can further enhance loss protection options, as recovering a password or similar authentication information, rather than recovering a physical device, can be sufficient to restore access to digital assets stored in the cryptographic wallet 1160. In some embodiments, the non-removably coupled cryptographic wallet can be air-gapped by, for example, disconnecting the host device 1180 from the Internet.

As shown, the cryptographic wallet 1160 can include a microcontroller 1162. The microcontroller 1162 can include or be communicatively coupled to (e.g., via a bus or similar communication pathway) at least a secure memory 1164. The cryptographic wallet 1160 can further include a transceiver 1182a, and input/output circuit 1184a, and/or a processor 1186a. In some embodiments, however, some or all of these components can be omitted.

In some embodiments, the cryptographic wallet 1160 can include a transceiver 1182a and therefore can be capable of independently connecting to a network and exchanging electronic messages with other computing devices. In some embodiments, the cryptographic wallet 1160 does not include a transceiver 1182a. The cryptographic wallet 1160 can be capable of connecting to or accessible from a network, via the transceiver 1182b of the host device 1180, when the cryptographic wallet 1160 is docked to the host device 1180. For example, in some embodiments, the user of the cryptographic wallet 1160 can participate in token exchange activities on decentralized exchanges when the cryptographic wallet 1160 is connected to the host device 1180.

In some embodiments, the cryptographic wallet 1160 can include an input/output circuit 1184a, which may include user-interactive controls, such as buttons, sliders, gesture-responsive controls, and/or the like. The user-interactive controls can allow a user of the cryptographic wallet 1160 to interact with the cryptographic wallet 1160 (e.g., perform balance inquiries, convert tokens, access exchanges and/or marketplaces, perform transactions, access computing systems, and/or the like). In some embodiments, the user can access an expanded feature set, via the input/output circuit 1184b of the host device 1180, when the cryptographic wallet 1160 is docked to the host device 1180. For example, host device 1180 can include computer-executable code structured to securely access data from the secure memory 1164 of the cryptographic wallet 1160 and to perform operations using the data. The data can include authentication information, configuration information, asset keys, and/or token management instructions. The data can be used by an application that executes on or by the host device 1180. The data can be used to construct application programming interface (API) calls to other applications that require or use the data provided by cryptographic wallet 1160. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 1164 is shown to include an authentication circuit 1166 and a digital asset management circuit 1172. The authentication circuit 1166 and/or digital asset management circuit 1172 include computer-executable code that, when executed by one or more processors, such as one or more processors of processor 1186a and/or processor 1186b, performs specialized computer-executable operations. For example, the authentication circuit 1166 can be structured to cause the cryptographic wallet 1160 to establish, maintain and manage a secure electronic connection with another computing device, such as the host device 1180. The digital asset management circuit 1172 can be structured to cause the cryptographic wallet 1160 to allow a user to manage the digital assets accessible via the cryptographic wallet 1160. In some embodiments, the authentication circuit 1166 and the digital asset management circuit 1172 are combined in whole or in part.

As shown, the authentication circuit 1166 can include retrievably stored security, authentication, and/or authorization data, such as the authentication key 1168. The authentication key 1168 can be a numerical, alphabetic, or alphanumeric value or combination of values. The authentication key 1168 can serve as a security token that enables access to one or more computing systems, such as the host device 1180. For instance, in some embodiments, when the cryptographic wallet 1160 is paired or docked to (e.g., establishes an electronic connection with) the host device 1180, the user may be prompted to enter authentication information via the input/output circuit(s) of input/output circuit 1184a and/or input/output circuit 1184b. The authentication information may include a PIN, a password, a pass phrase, biometric information (e.g., fingerprint, a set of facial features, a retinal scan), a voice command, and/or the like. The authentication circuit 1166 can compare the user-entered information to the authentication key 1168 and maintain the electronic connection if the items match at least in part.

As shown, the authentication circuit 1166 can include retrievably stored configuration information such as configuration information 1170. The configuration information 1170 can include a numerical, alphabetic, or alphanumeric value or combination of values. These items can be used to enable enhanced authentication protocols. For instance, the configuration information 1170 can include a timeout value for an authorized connection between the cryptographic wallet 1160 and the host device 1180. The configuration information 1170 can also include computer-executable code. In some embodiments, for example, where a particular cryptographic wallet, such as cryptographic wallet 1160, is set up to pair with only one or a small number of pre-authorized host devices such as host device 1180, the configuration information 1170 can include a device identifier and/or other device authentication information, and the computer-executable code may be structured to verify the device identifier and/or other device authentication information against the information associated with or provided by the host device 1180. When a pairing is attempted, the computer-executable code may initiate or cause the host device 1180 to initiate an electronic communication (e.g., an email message, a text message, etc.) using user contact information stored as configuration information 1170.

As shown, the digital asset management circuit 1172 can include retrievably stored digital asset data, such as the asset key 1174. The asset key 1174 can be a numerical, alphabetic, or alphanumeric value or combination of values. In some embodiments, the asset key 1174 is a private key in a public/private key pair, a portion thereof, or an item from which the private key can be derived. Accordingly, the asset key 1174 proves ownership of a particular digital asset stored on a blockchain system 1000. The asset key 1174 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The cryptographic wallet 1160 can be identified as a party to a blockchain transaction on the blockchain system 1000 using a unique cryptographically generated address (e.g., the public key in the public/private key pair).

As shown, the digital asset management circuit 1172 can also include retrievably stored asset management instructions such as asset management instructions 1176. The asset management instructions 1176 can include a numerical, alphabetic, or alphanumeric value or combination of values. These items can be used to enable computer-based operations related to managing digital assets identified by the asset key 1174. For instance, the asset management instructions 1176 can include parameter values, metadata, and/or similar values associated with various tokens identified by the asset key 1174 and/or by the blockchain system 1000 associated with particular tokens. The asset management instructions 1176 can also include computer-executable code. In some embodiments, for example, asset management functionality (e.g., balance inquiry and the like) can be executable directly from the cryptographic wallet 1160 rather than or in addition to being executable from the host device 1180.

Figure 12:
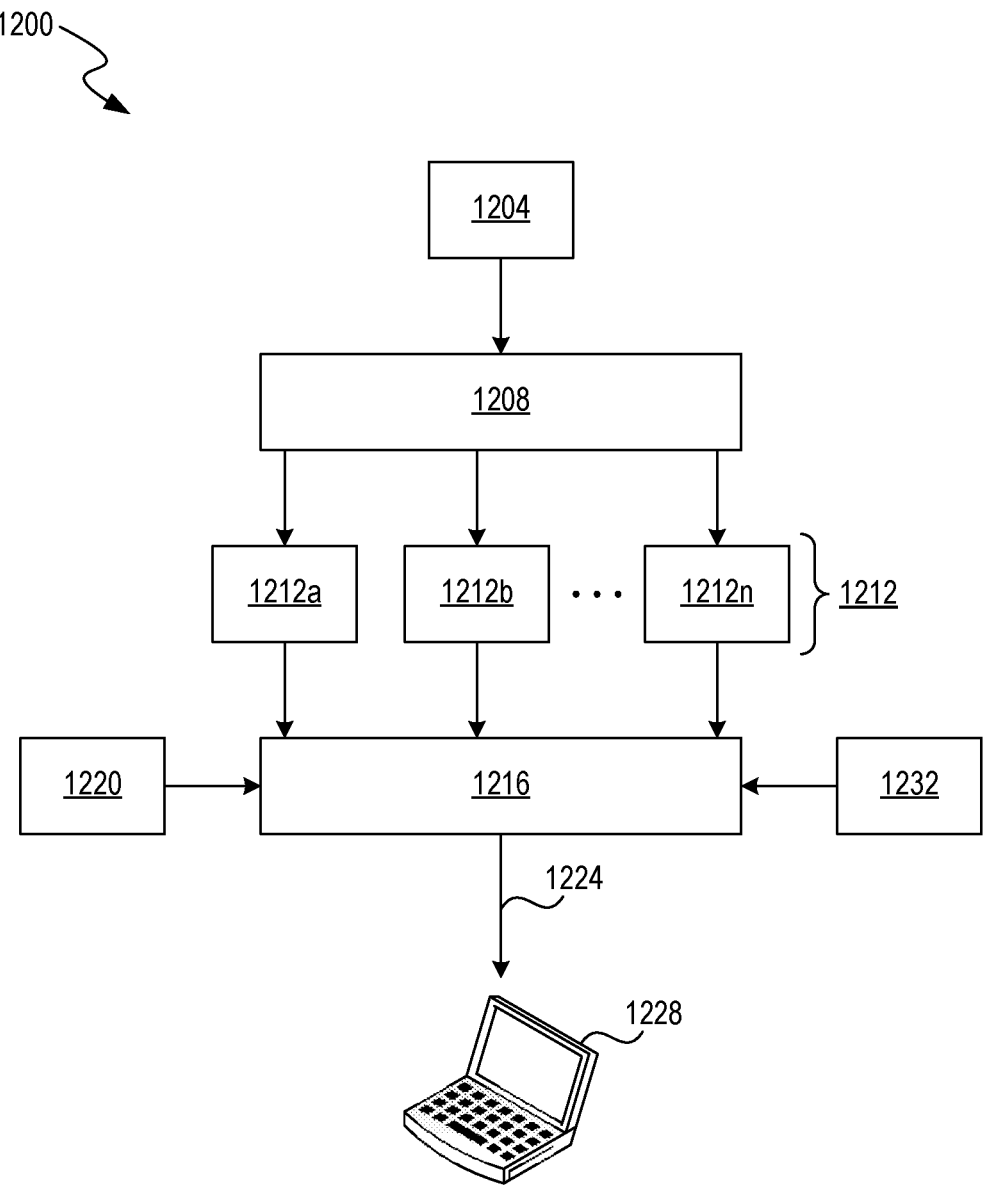
FIG. 12 is a block diagram illustrating an example machine learning (ML) system, in accordance with one or more embodiments of this disclosure.

FIG. 12 is a block diagram illustrating an example machine learning (ML) system 1200. The ML system 1200 is implemented using components of the example computer system 1300 illustrated and described in more detail with reference to FIG. 13. For example, the ML system 1200 can be implemented on the computer system 1300 using instructions 1308 programmed in the main memory 1306 illustrated and described in more detail with reference to FIG. 11A. Likewise, embodiments of the ML system 1200 can include different and/or additional components or be connected in different ways. The ML system 1200 is sometimes referred to as a ML module.

The ML system 1200 includes a feature extraction module 1208 implemented using components of the example computer system 1300 illustrated and described in more detail with reference to FIG. 11A. In some embodiments, the feature extraction module 1208 extracts a feature vector 1212 from input data 1204. The feature vector 1212 includes features 1212a, 1212b, . . . , 1212n. The feature extraction module 1208 reduces the redundancy in the input data 04, e.g., repetitive data values, to transform the input data 1204 into the reduced set of features such as feature vector 1212, e.g., features 1212a, 1212b, . . . , 1212n. The feature vector 1212 contains the relevant information from the input data 1204, such that events or data value thresholds of interest can be identified by the ML model 1216 by using this reduced representation. In some example embodiments, the following dimensionality reduction techniques are used by the feature extraction module 1208: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 1216 performs deep learning (also known as deep structured learning or hierarchical learning) directly on the input data 1204 to learn data representations, as opposed to using task-specific algorithms. In deep learning, no explicit feature extraction is performed; the features of feature vector 1212 are implicitly extracted by the ML system 1200. For example, the ML model 1216 can use a cascade of multiple layers of nonlinear processing units for implicit feature extraction and transformation. Each successive layer uses the output from the previous layer as input. The ML model 1216 can thus learn in supervised (e.g., classification) and/or unsupervised (e.g., pattern analysis) modes. The ML model 1216 can learn multiple levels of representations that correspond to different levels of abstraction, wherein the different levels form a hierarchy of concepts. In this manner, the ML model 1216 can be con=figured to differentiate features of interest from background features.

In one example, the ML model 1216, e.g., in the form of a CNN generates the output 1224, without the need for feature extraction, directly from the input data 1204. In some examples, the output 1224 is provided to the computer device 1228 or video display 1318. The computer device 1228 is a server, computer, tablet, smartphone, smart speaker, etc., implemented using components of the example computer system 1300 illustrated and described in more detail with reference to FIG. 11A. In some embodiments, the steps performed by the ML system 1200 are stored in memory on the computer device 1228 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1216 can be a CNN that includes both convolutional layers and max pooling layers. The architecture of the ML model 1216 can be "fully convolutional," which means that variable sized sensor data vectors can be fed into it. For all convolutional layers, the ML model 1216 can specify a kernel size, a stride of the convolution, and an amount of zero padding applied to the input of that layer. For the pooling layers, the ML model 1216 can specify the kernel size and stride of the pooling.

In some embodiments, the ML system 1200 trains the ML model 1216, based on the training data 1220, to correlate the feature vector 1212 to expected outputs in the training data 1220. As part of the training of the ML model 1216, the ML system 1200 forms a training set of features and training labels by identifying a positive training set of features that have been determined to have a desired property in question, and, in some embodiments, forms a negative training set of features that lack the property in question.

The ML system 1200 applies ML techniques to train the ML model 1216, that when applied to the feature vector 1212, outputs indications of whether the feature vector 1212 has an associated desired property or properties, such as a probability that the feature vector 1212 has a particular Boolean property, or an estimated value of a scalar property.

The ML system 1200 can further apply dimensionality reduction (e.g., via linear discriminant analysis (LDA), PCA, or the like) to reduce the amount of data in the feature vector 1212 to a smaller, more representative set of data.

The ML system 1200 can use supervised ML to train the ML model 1216, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 1232 is formed of additional features, other than those in the training data 1220, which have already been determined to have or to lack the property in question. The ML system 1200 applies the trained ML model (e.g., ML model 1216) to the features of the validation set 1232 to quantify the accuracy of the ML model 1216. Common metrics applied in accuracy measurement include: Precision and Recall, where Precision refers to a number of results the ML model 1216 correctly predicted out of the total it predicted, and Recall is a number of results the ML model 1216 correctly predicted out of the total number of features that had the desired property in question. In some embodiments, the ML system 1200 iteratively re-trains the ML model 1216 until the occurrence of a stopping condition, such as the accuracy measurement indication that the ML model 1216 is sufficiently accurate, or a number of training rounds having taken place. The validation set 1232 can include data corresponding to confirmed environmental features, object motion, any other type of training set, or combinations thereof. This allows the detected values to be validated using the validation set 1232. The validation set 1232 can be generated based on analysis to be performed.

In some embodiments, ML system 1200 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Figure 13:
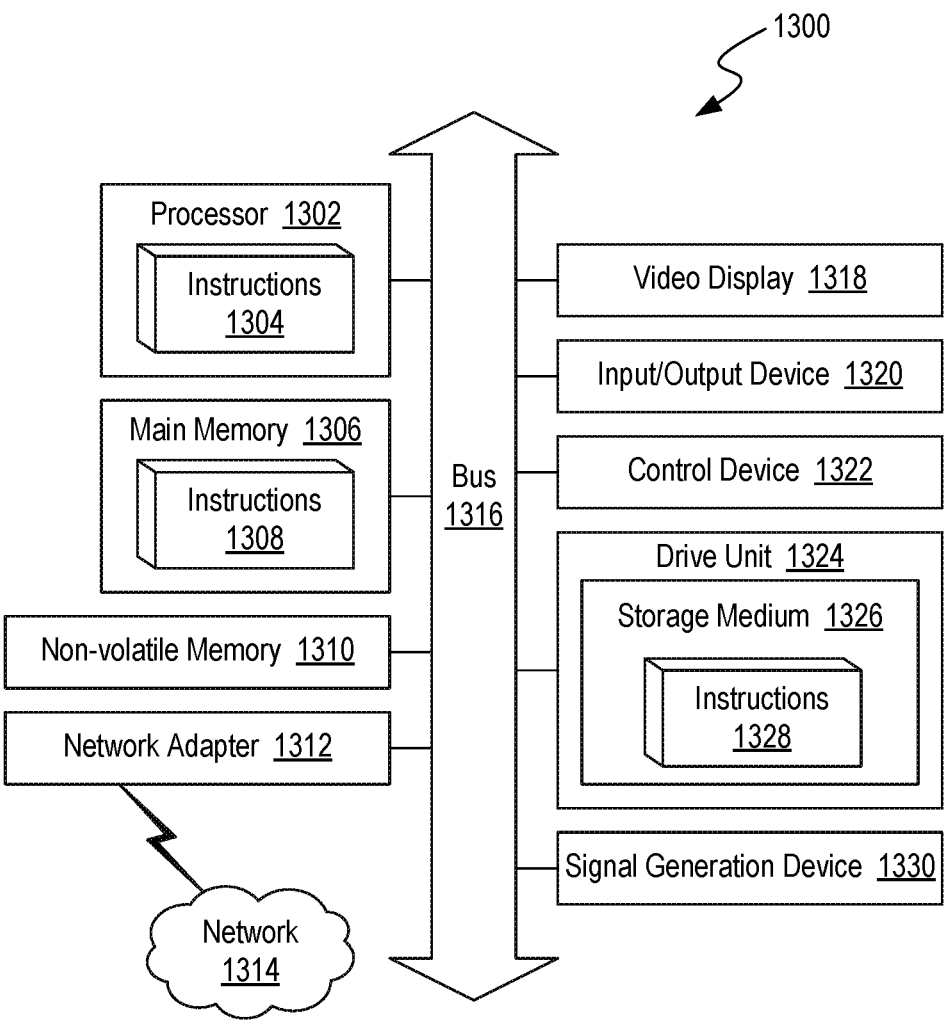
FIG. 13 is a block diagram illustrating an example computer system, in accordance with one or more embodiments of this disclosure.

FIG. 13 is a block diagram illustrating an example computer system 1300, in accordance with one or more embodiments. In some embodiments, components of the example computer system 1300 are used to implement the blockchain system 1000 or the ML system 1200 illustrated and described in more detail with reference to FIGS. 10 and 12. At least some operations described herein can be implemented on the computer system 1300.

The computer system 1300 can include one or more central processing units ("processors") such as one or more processors 1302, and can further include main memory 1306, non-volatile memory 1310, network adapter 1312

(e.g., network interface), video displays 1318, input/output devices 1320, control devices 1322 (e.g., keyboard and pointing devices), drive units 1324 including a storage medium 1326, and a signal generation device 1330 that are communicatively connected to a bus 1316. The bus 1316 is illustrated as an abstraction that represents one or more physical buses and/or point-to-point connections that are connected by appropriate bridges, adapters, or controllers. The bus 1316, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1300 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1300.

While the main memory 1306, non-volatile memory 1310, and storage medium 1326 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1328. The term "machine-readable medium" and "storage medium" shall also be taken to include any medium that is capable of storing, encoding, or carrying a set of instructions for execution by the computer system 1300.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1304, 1308, 1328) set at various times in various memory and storage devices in a computer device. When read and executed by the one or more processors 1302, the instruction(s) cause the computer system 1300 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and/or non-volatile memory 1310, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1312 enables the computer system 1300 to mediate data in a network 1314 with an entity that is external to the computer system 1300 through any communication protocol supported by the computer system 1300 and the external entity. The network adapter 1312 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1312 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

FIG. 14 is a flow diagram illustrating a process 1400 for transcoding in security camera applications, in accordance with one or more embodiments of this disclosure. In some implementations, process 1400 is performed by base station 105 or camera 110 described in more detail with reference to FIG. 1A. In some implementations, the process is performed by a computer system, e.g., the example computer system 1400 illustrated and described in more detail with reference to FIG. 14. Particular entities, for example, an XR device, a blockchain node, or an ML system perform some or all of the steps of process 1400 in other implementations. Likewise, implementations can include different and/or additional steps or can perform the steps in different orders.

In step 1405, a computer system determines first network parameters associated with a first network communicably coupling a base station to a video streaming server. For example, the computer system is part of a base station. Determining the first network parameters can be performed by the monitoring component 310 illustrated and described in more detail with reference to FIG. 3. Example network parameters are described in more detail with reference to FIGS. 1A-B. An example video streaming server 180 is illustrated and described in more detail with reference to FIG. 2. The first network can be cloud network 140 illustrated and described in more detail with reference to FIG. 2.

The base station is configured to receive a first video stream from the video streaming server. An example video stream 130 is illustrated and described in more detail with reference to FIG. 1A. In some embodiments, a request for access to the video streaming server is received, e.g., by the base station from an extended-reality (XR) device. The request can include a credential stored in a digital wallet. The credential can be a password, security keys, a crypto-graphic key, etc. An example digital wallet 1160 is illustrated and described in more detail with reference to FIG. 11B. For example, a user of the base station or another electronic device (e.g., user device 165 illustrated and described in more detail with reference to FIG. 2) gains access to the base station or the video streaming server using a credential stored in a digital wallet. In some embodiments, the computer system receives a request for access to the video streaming server using self-sovereign identity (SSI). SSI is described in more detail with reference to FIG. 10. For example, a user of the XR device or another electronic device (e.g., user device 165 illustrated and described in more detail with reference to FIG. 2) logs into an XR application or gains access to the video streaming server using SSI.

In step 1410, the computer system extracts a feature vector from the first network parameters and second network parameters associated with a second network communicably coupling the base station to an XR device executing an XR application. For example, extracting the feature vector is performed by the monitoring component 310 or by transcoding component 315 illustrated and described in more detail with reference to FIG. 3. An example feature vector 1212 is illustrated and described in more detail with reference to FIG. 12. The second network can be network 125 illustrated and described in more detail with reference to FIG. 1B. Example XR devices are illustrated and described in more detail with reference to FIGS. 8-9. The XR application can be an XR game or a security monitoring application, e.g., at a mall.

In step 1415, the computer system transcodes, using a machine learning model, the first video stream based on the feature vector. The transcoding can be performed by transcoding component 315 illustrated and described in more detail with reference to FIG. 3. An example machine learning model 1216 is illustrated and described in more detail with reference to FIG. 12. The machine learning model is trained to increase at least one performance metric of the XR application based on network data. Example ML training methods are described in more detail with reference to FIG. 12. The performance metrics can include clarity of night-vision images, brightness of images in the video, accuracy of colors in day-vision images, color mapping, etc.

In some embodiments, the machine learning model is trained based on the network data using an XR simulation. XR simulations are described in more detail with reference to FIGS. 8-9. The network data can include stored historical network parameters, changes in network parameters, device parameters etc. In some embodiments, transcoding the first video stream includes changing at least one of a codec or a file format of the first video stream based on a device parameter of the XR device. Changing of codecs and file formats is described in more detail with reference to FIGS. 1A and 2. In some embodiments, transcoding the first video stream includes enhancing the first video stream to increase visibility of objects in the XR video stream. Enhancing a video stream to improve object visibility is described in more detail with reference to FIG. 5.

In step 1420, the computer system sends the transcoded first video stream to the XR device for combining the first video stream with a second video stream, produced by a camera of the XR device, into an XR video stream for display on an electronic display of the XR device by the XR application. Combining the two video streams can be performed by merging or concatenating the video streams. The combining can be constructive (i.e., additive to the second video stream), or destructive (i.e., masking of the second video stream). The first video stream can be seamlessly interwoven with the second video stream such that it is perceived as an immersive aspect of the XR video stream. Example cameras are illustrated and described in more detail with reference to FIGS. 1A and 8-9. In some embodiments, the XR video stream is associated with an electronic game. For example, XR gaming systems generate realistic sensations that simulate users' physical presence in a computer-generated environment. XR gaming systems can let users believe they inhabit a virtual world. Users playing an XR game move around a virtual world and interact with virtual features and items, such as NFTs. For example, the electronic game is associated with a blockchain that stores NFTs for players to earn or interact with while playing the game.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

We claim:

1. A computer-implemented method comprising:
   determining, by a base station, first network parameters associated with a first network communicably coupling the base station to a video streaming server,
      wherein the base station is configured to receive a first video stream from the video streaming server;
   extracting a feature vector from the first network parameters and second network parameters associated with a second network communicably coupling the base station to an extended-reality (XR) device executing an XR application,
   transcoding, using a machine learning model, the first video stream based on the feature vector,
      wherein the machine learning model is trained to increase at least one performance metric of the XR application based on network data;
   receiving, from the XR device, a request for access to the video streaming server using self-sovereign identity (SSI),
      wherein the request includes a single decentralized identifier stored in a digital wallet, and
      wherein the single decentralized identifier is verifiable using SSI; and
   sending the transcoded first video stream to the XR device for combining the first video stream with a second video stream, produced by a camera of the XR device, into an XR video stream for display on an electronic display of the XR device by the XR application.

2. The method of claim 1, comprising:
   training the machine learning model, based on the network data, using an XR simulation.

3. The method of claim 1, wherein transcoding the first video stream comprises:
   changing at least one of a codec or a file format of the first video stream based on a device parameter of the XR device.

4. The method of claim 1, wherein transcoding the first video stream comprises:
   enhancing the first video stream to increase visibility of objects in the XR video stream.

5. The method of claim 1, wherein the XR video stream is associated with an electronic game, and
   wherein the electronic game is associated with a blockchain.

6. A base station comprising:
   a monitoring component configured to:
      determine first network parameters associated with a first network communicably coupling the base station to a video streaming server,
         wherein the base station is configured to receive a first video stream from the video streaming server;
   a transcoding component communicably coupled to the monitoring component and configured to:
      extract a feature vector from the first network parameters and second network parameters associated with a second network communicably coupling the base station to an extended-reality (XR) device executing an XR application; and
      transcode the first video stream based on the feature vector; and
   a transceiver communicably coupled to the transcoding component and configured to:
      receive, from the XR device, a request for access to the video streaming server using self-sovereign identity (SSI),
         wherein the request includes a single decentralized identifier stored in a digital wallet, and
         wherein the single decentralized identifier is verifiable using SSI; and
      send the transcoded first video stream to the XR device for combining the first video stream with a second video stream, produced by a camera of the XR device, into an XR video stream for display on an electronic display of the XR device by the XR application.

7. The base station of claim 6, wherein the base station is configured to:

extract a feature vector from the first network parameters and the second network parameters, wherein transcoding the first video stream is performed using a machine learning model based on the feature vector.

8. The base station of claim 6, wherein transcoding the first video stream is performed using a machine learning model trained to increase at least one performance metric of the XR application based on network data.

9. The base station of claim 6, wherein the base station is configured to:

train the machine learning model, based on the network data, using an XR simulation.

10. The base station of claim 6, wherein the base station is configured to:

change at least one of a codec or a file format of the first video stream based on a device parameter of the XR device.

11. A non-transitory, computer-readable storage medium storing computer instructions, which when executed by one or more computer processors cause the one or more computer processors to:

determine first network parameters associated with a first network communicably coupling a base station to a video streaming server, wherein the base station is configured to receive a first video stream from the video streaming server;

extract a feature vector from the first network parameters and second network parameters associated with a second network communicably coupling the base station to an extended-reality (XR) device executing an XR application, transcode the first video stream based on the feature vector;

receive, from the XR device, a request for access to the video streaming server using self-sovereign identity (SSI), wherein the request includes a single decentralized identifier stored in a digital wallet, and wherein the single decentralized identifier is verifiable using SSI; and send the transcoded first video stream to the XR device for combining the first video stream with a second video stream, produced by a camera of the XR device, into an XR video stream for display on an electronic display of the XR device by the XR application.

12. The non-transitory, computer-readable storage medium of claim 11, wherein the computer instructions cause the one or more computer processors to:

extract a feature vector from the first network parameters and the second network parameters, wherein transcoding the first video stream is performed using a machine learning model based on the feature vector.

13. The non-transitory, computer-readable storage medium of claim 11, wherein transcoding the first video stream is performed using a machine learning model trained to increase at least one performance metric of the XR application based on network data.

14. The non-transitory, computer-readable storage medium of claim 11, wherein the computer instructions cause the one or more computer processors to:

train the machine learning model, based on the network data, using an XR simulation.

* * * * *